US007882555B2

United States Patent
Ben-Itzhak

(10) Patent No.: US 7,882,555 B2
(45) Date of Patent: *Feb. 1, 2011

(54) APPLICATION LAYER SECURITY METHOD AND SYSTEM

(75) Inventor: Yuval Ben-Itzhak, Kiron (IL)

(73) Assignee: Kavado, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/446,054

(22) Filed: May 28, 2003

(65) Prior Publication Data

US 2003/0204719 A1     Oct. 30, 2003

Related U.S. Application Data

(63) Continuation-in-part of application No. PCT/US02/08029, filed on Mar. 15, 2002, which is a continuation-in-part of application No. 09/809,030, filed on Mar. 16, 2001.

(51) Int. Cl.
*G06F 15/16* (2006.01)
*G06F 12/14* (2006.01)
*H04L 29/06* (2006.01)

(52) U.S. Cl. .............................. 726/13; 726/22; 713/152
(58) Field of Classification Search .................. 713/200
See application file for complete search history.

(56) References Cited

U.S. PATENT DOCUMENTS

| 4,734,853 A | 3/1988 | Nakano |
| 5,073,933 A | 12/1991 | Rosenthal |
| 5,166,977 A | 11/1992 | Ross |
| 5,191,611 A | 3/1993 | Lang |
| 5,220,604 A | 6/1993 | Gasser et al. |
| 5,224,163 A | 6/1993 | Gasser et al. |
| 5,315,657 A | 5/1994 | Abadi et al. |
| 5,317,742 A | 5/1994 | Bapat |
| 5,347,578 A | 9/1994 | Duxbury |
| 5,559,800 A | 9/1996 | Mousseau et al. |
| 5,566,326 A | 10/1996 | Hirsch et al. |

(Continued)

FOREIGN PATENT DOCUMENTS

EP     1160643 A2     12/2001

(Continued)

OTHER PUBLICATIONS

Scott, David, Sharp, Richard, "Abstracting Application-Level Web Security," May 2002, WWW2002, pp. 396-407.*

(Continued)

*Primary Examiner*—Kaveh Abrishamkar
(74) *Attorney, Agent, or Firm*—Paul, Hastings, Janofsky & Walker LLP

(57) ABSTRACT

The invention provides an application layer security method and system to secure trusted computer applications from executing out of their intended and authorized scope caused by illegal or harmful operation requests received from a distrusted environment. In an embodiment of the invention, a protective layer is implemented in between a trusted application and distrusted application operation requests. In operation, the protective layer identifies an application path of each operation request. Depending on the application path identified, one or more security pipes scrutinize the application contents of the operation request to determine if the operation request is illegal or harmful to the application or a surrounding environment.

22 Claims, 21 Drawing Sheets

U.S. PATENT DOCUMENTS

| | | | |
|---|---|---|---|
| 5,594,227 A * | 1/1997 | Deo | 235/380 |
| 5,611,048 A | 3/1997 | Jacobs et al. | |
| 5,623,600 A | 4/1997 | Ji et al. | |
| 5,623,601 A | 4/1997 | Vu | |
| 5,629,981 A | 5/1997 | Nerlikar | |
| 5,657,390 A | 8/1997 | Elgamal et al. | |
| 5,724,355 A | 3/1998 | Bruno et al. | |
| 5,748,884 A | 5/1998 | Royce et al. | |
| 5,774,695 A | 6/1998 | Autrey et al. | |
| 5,778,189 A | 7/1998 | Kimura et al. | |
| 5,826,014 A | 10/1998 | Coley et al. | |
| 5,870,544 A | 2/1999 | Curtis | |
| 5,889,953 A | 3/1999 | Thebaut et al. | |
| 5,892,900 A | 4/1999 | Ginter et al. | |
| 5,908,469 A | 6/1999 | Botz et al. | |
| 5,910,987 A | 6/1999 | Ginter et al. | |
| 5,917,912 A | 6/1999 | Ginter et al. | |
| 5,933,498 A | 8/1999 | Schneck et al. | |
| 5,941,947 A | 8/1999 | Brown et al. | |
| 5,944,794 A | 8/1999 | Okamoto et al. | |
| 5,949,876 A | 9/1999 | Ginter et al. | |
| 5,968,176 A | 10/1999 | Nessett et al. | |
| 5,974,549 A | 10/1999 | Golan | |
| 5,982,891 A | 11/1999 | Ginter et al. | |
| 5,983,270 A | 11/1999 | Abraham et al. | |
| 6,035,423 A | 3/2000 | Hodges et al. | |
| 6,092,194 A | 7/2000 | Touboul | |
| 6,105,027 A * | 8/2000 | Schneider et al. | 707/9 |
| 6,154,844 A | 11/2000 | Touboul et al. | |
| 6,158,010 A | 12/2000 | Mark et al. | |
| 6,199,181 B1 | 3/2001 | Rechef et al. | |
| 6,226,372 B1 | 5/2001 | Beebe et al. | |
| 6,298,445 B1 | 10/2001 | Shostack et al. | |
| 6,311,278 B1 * | 10/2001 | Raanan et al. | 713/201 |
| 6,317,868 B1 | 11/2001 | Grimm et al. | |
| 6,321,337 B1 * | 11/2001 | Reshef et al. | 726/14 |
| 6,356,906 B1 | 3/2002 | Lippert et al. | |
| 6,477,651 B1 * | 11/2002 | Teal | 713/200 |
| 6,510,464 B1 * | 1/2003 | Grantges et al. | 709/225 |
| 6,513,060 B1 | 1/2003 | Nixon et al. | |
| 6,584,569 B2 * | 6/2003 | Reshef et al. | 726/25 |
| 6,647,400 B1 | 11/2003 | Moran | |
| 6,668,282 B1 | 12/2003 | Booth, III et al. | |
| 6,684,329 B1 * | 1/2004 | Epstein et al. | 713/150 |
| 6,754,664 B1 | 6/2004 | Bush | |
| 6,766,368 B1 | 7/2004 | Jakobson et al. | |
| 6,782,418 B1 | 8/2004 | Cerrone et al. | |
| 6,785,821 B1 * | 8/2004 | Teal | 713/200 |
| 6,792,461 B1 * | 9/2004 | Hericourt | 709/225 |
| 6,842,758 B1 * | 1/2005 | Bogrett | 707/100 |
| 6,895,383 B2 | 5/2005 | Heinrich | |
| 6,944,678 B2 * | 9/2005 | Lu et al. | 709/245 |
| 6,952,779 B1 | 10/2005 | Cohen et al. | |
| 6,970,943 B1 * | 11/2005 | Subramanian et al. | 709/238 |
| 6,988,209 B1 * | 1/2006 | Balasubramaniam et al. | 726/22 |
| 6,996,845 B1 * | 2/2006 | Hurst et al. | 726/25 |
| 7,000,247 B2 | 2/2006 | Banzhof | |
| 7,152,240 B1 | 12/2006 | Green et al. | |
| 7,162,742 B1 | 1/2007 | Flowers et al. | |
| 2001/0034847 A1 * | 10/2001 | Gaul, Jr. | 713/201 |
| 2002/0133590 A1 * | 9/2002 | McBrearty et al. | 709/225 |
| 2002/0162021 A1 | 10/2002 | Audebert et al. | |
| 2002/0169986 A1 * | 11/2002 | Lortz | 713/201 |
| 2003/0041263 A1 * | 2/2003 | Devine et al. | 713/201 |
| 2003/0056116 A1 | 3/2003 | Bunker et al. | |
| 2003/0131256 A1 | 7/2003 | Ackroyd | |
| 2003/0135749 A1 | 7/2003 | Gales et al. | |
| 2003/0233581 A1 * | 12/2003 | Reshef et al. | 713/201 |
| 2004/0010709 A1 | 1/2004 | Baudoin et al. | |
| 2004/0123141 A1 * | 6/2004 | Yadav | 713/201 |
| 2005/0005112 A1 * | 1/2005 | Someren | 713/167 |
| 2006/0137014 A1 * | 6/2006 | Hurst et al. | 726/25 |

FOREIGN PATENT DOCUMENTS

| | | |
|---|---|---|
| EP | 1160645 A2 | 12/2001 |
| EP | 1161048 | 12/2001 |
| WO | 9956196 A1 | 11/1999 |
| WO | 00/16200 | 3/2000 |
| WO | 00/16206 | 3/2000 |
| WO | 02075547 A1 | 9/2002 |

OTHER PUBLICATIONS

"Security Assessment Methodology", Network Magazine India, Dec. 2001, Retrieved from the Internet on Jun. 15, 2007: <URL: http://www.networkwmagazineindia.com/200112/cover2.htm>.

Andress, "Network Scanner Pinpoint Problems", Network World, Jun. 2002, Retrieved from the Internet on Jun. 15, 2007 <URL: http://www.networkworld.com/reviews/2002/0204bgrev.html.

Bertino et al., "On Specifying Security Policies for Web Documents With an XML-Based Language", 2001.

Ceponkus et al., "XML As an Information Exchange Format Between Clients and Servers", Applied XML: A Toolkit for Programmers, 1999, XP002275167.

Ghosh et al., "Detecting Anomalous and Unknown Intrusions Against Programs", Computer Security Applications Conference, 1998. Proceedings. 14th Annual, Phoenix, AZ, USA Dec. 7-11, 1998, Los Alamitos, CA, USA, IEEE Comput. Soc. US, Dec. 7, 1998, pp. 259-267, XP010318640.

Javitz et al., "The SRI IDES Statistical Anomaly Detector", Proceedings on the Symposium on Research in Security and Privacy, Oakland, May 20-22, 1991, Los Alamitos, IEEE Comp. Soc. Press, US, vol. Symp. 12, May 20, 1991, pp. 316-326, XP 010024232.

Symantec Corporation, "E-Security Begins with Sound Security Policies", Announcement Symantec, Jun. 14, 2001, XP002265695.

Toshiba, "MAGNIA2000Ri/Anti-Hacker User's Guide", A2 Edition, K.K. Toshiba Digital Media Network Inc., Feb. 28, 2001.

http://www.f5networks.com, TrafficShield Application Firewall, p. 1-2.

U.S. Appl. No. 60/345,689, filed Dec. 31, 2001.

E-Business Application Security Software, Oct. 1999, p. 1-2, Oct. 2004.

Kessler, Securing Your Web Site, Feb. 2000.

Schultz, Firewall Appliances, InternetWeek, Feb. 21, 2000.

Yasin, App Security Vaults to Fore, InternetWeek, Sep. 6, 1999.

Israel Office Action dated Jan. 4, 2010 from corresponding Israel Patent Application No. 172178 wherein a related application was rejected in light of US Patent No. 6,510,464 and US Publication No. US2003041263.

* cited by examiner

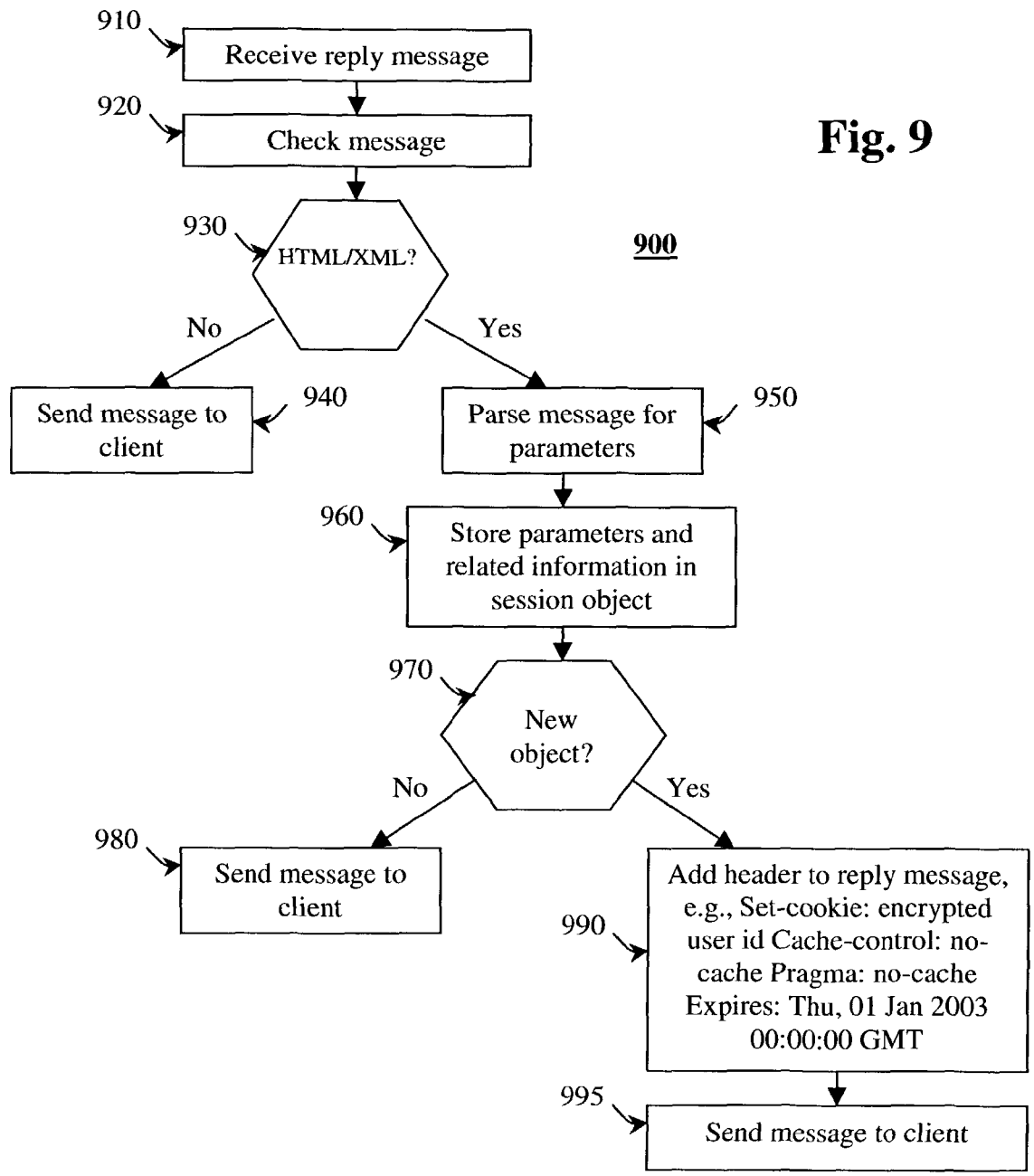

```
<HTML>
 <BODY>
        <FORM METHOD=POST name="my form">
                <INPUT TYPE="hidden" Name="Product#" Value="1234">
                <INPUT TYPE="hidden" Name="Price" Value="100$">
                <INPUT TYPE="hidden" Name="Serial#" Value=123456789>
                <INPUT TYPE="text" NAME="Payment method">
                <INPUT TYPE="submit">
        </FORM>
 </BODY>
</HTML>
```

Fig. 10B

```
<HTML>
 <BODY>
        <FORM METHOD=POST name="my form">
                <INPUT TYPE="hidden" Name="Product#" Value="kvdASDFBGFDDTG ">
                <INPUT TYPE="hidden" Name="Price" Value="kvdFGGJYRYFHDFGH">
                <INPUT TYPE="hidden" Name="Serial#" Value="kvd FDGSDFGRT ">
                <INPUT TYPE="hidden" Name="PKey" Value="kvdLEKTJFHSBNR">
                <INPUT TYPE="text" NAME="Payment method">
                <INPUT TYPE="submit">
        </FORM>
 </BODY>
```

Fig. 10C

```
<HTML>
 <BODY>
        <FORM METHOD=POST name="my form">
                <INPUT TYPE="hidden" Name="Product#" Value="1234">
                <INPUT TYPE="hidden" Name="Price" Value="100$">
                <INPUT TYPE="hidden" Name="Serial#" Value=123456789>
                <INPUT TYPE="hidden" Name="Product#" Value="kvdASDFBGFDDTG ">
                <INPUT TYPE="hidden" Name="Price" Value="kvdFGGJYRYFHDFGH">
                <INPUT TYPE="hidden" Name="Serial#" Value="kvd FDGSDFGRT ">
                <INPUT TYPE="hidden" Name="PKey" Value="kvdLEKTJFHSBNR">
                <INPUT TYPE="text" NAME="Payment method">
                <INPUT TYPE="submit">
        </FORM>
 </BODY>
</HTML>
```

Fig. 10D

APPLICATION LAYER SECURITY METHOD AND SYSTEM

CROSS-REFERENCE TO RELATED APPLICATIONS

The present application is a continuation-in-part of Patent Cooperation Treaty (PCT) application no. PCT/US02/08029, filed Mar. 15, 2002, and entitled "Application Layer Security Method and System," which is hereby incorporated by reference in its entirety.

BACKGROUND OF THE INVENTION

1. Field of the Invention

The present invention relates to information security, particularly to an application layer security method and system for protecting trusted computer applications from executing illegal or harmful operation requests originating from an unknown or distrusted source.

2. Description of Background

The ease, accessibility, and convenience of the Internet have rapidly changed the way people use computers and access information. The World Wide Web ("WWW"), often referred to as 'the web,' is one of the most popular means for retrieving information on the Internet. The web gives users access to an almost infinite number of resources such as interlinked hypertext documents retrieved via a hypertext transfer protocol ("HTTP") from servers located around on the world. The web operates in a basic client-server format, wherein servers are dedicated computers or individual computer applications that execute resources in a certain matter, such as storing and transmitting web documents or binary objects, to client computers on the network. For example, a user can interact with a server through a web browser in order to view retrieved information or to request an application on the server to operate in a desired manner.

Documents on the web, referred to as web pages, are typically written in a hypertext markup language ("HTML") or similar language, and identified by uniform resource locators ("URLs") that specify a particular machine and pathname by which a file or resource can be accessed. Codes, often referred to as tags, embedded in an HTML document associate particular words and images in the document with URLs so that a user can access another file or page by pressing a key or clicking a mouse. These files generally comprise text, images, videos, and audio, as well as applets or other embedded software programs, written in for example, Java or ActiveX, that execute when the user activates them by clicking on a hyperlink. A user viewing a web page may also interact with components that, for example, forward requested information supplied by the user to a server through the use of forms, download files via file transfer protocol ("FTP"), facilitate user participation in chat rooms, conduct secure business transactions, and send messages to other users via e-mail by using links on the web page.

Typically, the components that legitimate users desire and that are likely to make a web site spectacular or popular can also make a server and surrounding network environment vulnerable to attack from malicious, irresponsible, or criminally-minded individuals. This is referred to as "web hacking" and generally involves taking advantage of mistakes or vulnerabilities in web design through the server applications themselves. Web hacking is different from traditional system or application hacking because an attack generally takes place via application layer protocols. Generally, the easier it is for clients to talk or interact directly to the server applications through a web page, the easier it is for someone to hack into those applications. Typical attacks include, but are not limited to, defacing a page by deleting graphics and replacing them with doctored, sometimes lurid, graphics; altering or stealing password files; deleting data files; pirating copyrighted works; tampering with credit and debit card numbers, or other customer information; publicizing private business information; accessing confidential or unauthorized information; and searching through internal databases. Thus, web hacking causes inconvenience and perhaps irreversible damage to users, customers, businesses, and operators of the server(s). Generally, conventional computer security methods fail to address or completely ignore web hacking concerns.

The International Organization for Standardization ("ISO") developed a set of protocol standards designed to enable computers to connect with one another and to exchange information with as little error as possible. The protocols generally accepted for standardizing overall computer communications are designated in a seven-layer set of hardware and software guidelines known as the open systems interconnection ("OSI") model. This protocol model forms a valuable reference and defines much of the language used in data communications. As illustrated in FIG. 1, the application layer is the highest layer of standards in the OSI model.

Conventional security methods are typically implemented between either the data link layer and physical layer by using a firewall or the session and transport layers by using a secure socket layer ("SSL") or public key infrastructure ("PKI"). A firewall is a type of security implementation intended to protect a trusted environment or network against external threats at the data link layer originating from another network, such as the Internet. A firewall prevents computers behind the firewall from communicating directly with computers external to the trusted network. Instead, all communications are routed through a proxy server outside of a trusted network, and the proxy server decides whether it is safe to let a particular message type or file type pass through, based on a set of filters, to the trusted network. A secure socket layer is an open standard developed by Netscape Communications® for establishing a secure and encrypted communications channel to prevent the interception of critical information, such as credit card information. The primary purpose of using SSL is to enable secure and encrypted electronic transactions on public networks, such as the web. A public key infrastructure or trust hierarchy is a system of digital certificates, certificate authorities, and other registration authorities that verify and authenticate each party involved in a communication session. PKIs are currently evolving and there is no single PKI nor even a single agreed-upon standard for setting up a PKI. One drawback of the above noted conventional technologies is that they do not perform an inspection of the application layer protocol, i.e., they do not scrutinize the application content of an incoming request. Therefore, these technologies can not prevent web hacking attacks directed through the application content of an operation request.

Web hackers can easily attack computer systems by exploiting flaws and vulnerabilities in web design. For example, default scripts may allow files to be uploaded onto a web server; a web server's treatment of environmental variables may be exploited; and the existences of 'backdoors' or flaws in third party products allow unauthorized access. These techniques can be potent attacks and are generally difficult to defend against through conventional means. Each month new software vulnerabilities are discovered, but many system operators typically leave these holes unpatched and their systems open to preventable attacks. Major corporations and government agencies utilizing well configured firewalls, PKI, and SSL implementations have been infiltrated by hackers using known application layer intrusions. These intrusions typically involve illegal and harmful requests that are sent to an application forcing it to execute out of its intended or authorized scope of operation. This may exploit the application to damage itself, files, buffers, other applications, performance, or confidentiality of information.

Two conventional approaches attempt to address some of these problems. One technique involves tracking a server operating system to identify suspicious events such as deleting a file or formatting a disk. However, this type of reactionary technique typically activates only after damage has commenced or been completed. A second technique involves the installation of a network filter in front of an application and updating the filter database with known patterns that can affect the application. However, this technique is limited in that it is unable to identify patterns, which are not yet "known" by the filter database. In other words, the capability of this technique is directly related to the comprehensiveness of the filter database that it draws the patterns from. To increase capability, the filter database requires continual updating. Further, these techniques will not protect against manipulations of environmental variables or the application's implemented business process.

In addition, conventional security solutions typically fail to address the increased hacking opportunities caused by the proliferation of electronic commerce ("e-commerce"), mobile, and interactive television ("iTV") applications. These applications generally require the combination of numerous components operating on different platforms all working together using different technologies. For example, a single application can comprise a plurality of components, such as, a web server application; transaction server application; database; and Java, ActiveX, and Flash applets all working together. Generally, conventional security solutions are unable to meet the unique security needs of each component in a multiple component system.

SUMMARY OF THE INVENTION

The present invention overcomes these and other deficiencies of the related art by providing an application layer security method and system for preventing trusted computer applications and related resources from being accessed or executed by unauthorized users directly through the application itself.

In an embodiment of the invention, a method for protecting an application from executing an illegal or harmful operation request received from a distrusted environment comprises the steps of applying one or more pipes to an incoming operation request. Illegal and harmful operation requests may cause damage or allow unauthorized access to the application, other applications, a trusted network, one or more data files, memory, buffers, performance, confidential information, hardware, software, a database, an information server, and the like. For example, illegal and harmful operation request may be database manipulations; attacks on known Internet information server vulnerabilities or application vulnerabilities; URL manipulations; business process manipulation; and the like. When an operation request is identified to be illegal or harmful, those request may be rejected entirely, or modified into or replace with a legal or harmless operation request.

In an embodiment of the invention, a security system routs application operation requests or results received or identified in a packet or stream of packets coming from the application server or from the application requester (client), before or after execution. In operation, an incoming packet or stream of packets is forwarded to an identifier that identifies one or more application commands or parameters, or a portion thereof, in an operation request. Identified commands or parameters are then forwarded to a router that comprises a routing scheme that directs each command or the entire request to an appropriate tunnel depending on, for example, the type of command, the application being requested, client identification, or a combination thereof. A feature of the invention is that different pipes can be applied to different parts of the operation request.

In an embodiment of the invention, one or more pipes are applied to a request or reply based on an identified application attribute of the request or reply.

In an embodiment of the invention, a database driven pipe involves database operations and is aimed at finding patterns that show malicious intentions in a database request. Particularly, the contents of incoming database requests are inspected for permitted syntax based on the type of database used and the existence of one or more embedded harmful SQL commands.

In another embodiment of the invention, a deterministic type pipe inspects incoming operation requests for known vulnerability patterns. All known application vulnerabilities, and the respective requests that take advantage thereof, are stored and compared to the incoming request. If the comparison results in a match, the incoming request is blocked and is not allowed to proceed to the application. Further, this pipe can shield applications against unknown vulnerabilities by eliminating the use of executables, methods, and scripts, which if accessed or executed, could negatively affect or allow illegal access to the application environment or servers.

In another embodiment of the invention, a pipe that protects application attributes is provided to ensure that the attribute values set by an application are returned from the client without any modification. Particularly, an attributes identifier encrypts certain predefined attributes that might return from the client to prevent a client from manipulating them.

In another embodiment of the invention, an application-node blocking pipe restricts remote user requests from entering application paths that are designated as restricted by an application owner. Application owners may sometimes keep applications running for fear of losing business, even though a vulnerability is known within the application, until a production patch is available. Using this pipe, application owners can block a vulnerable application path from being accessed while keeping other application paths available to clients.

In another embodiment of the invention, a pipe blocks distrusted operation requests from being forwarded to a trusted environment or zone within a trusted network. By implementing this pipe, an administrator can restrict a remote user's specific messages to only those that are designated as allowed.

In another embodiment of the invention, a pipe validates an incoming parameter value according to pre-defined expression rules.

In another embodiment of the invention, a cookie-based pipe protects client side cookies from being modified or manipulated by the user. This pipe ensures that internal information stored in the cookie will not be available to the user but will transparently be clear to the application without applying any change to the application itself.

In another embodiment of the invention, a SOAP pipe protects web services from servicing harmful client requests and preventing requests for services that remote clients or a specific client is unauthorized to call. Particularly, this pipe ensures that web services operate as designed and implemented by the application owner and that all client requests match the web service's definitions and data structures as well as allow access to only those services that remote clients are authorized to request.

In another embodiment of the invention, a learning technique allows the parameters in a request to be "fine tuned" to better match the most common values entered by the clients, i.e., requesters, determined from a statistical model. A dynamic range of entered values is built for each parameter in a request that a client sends. Based on the statistical mode implemented, a range of probable, i.e., most often entered or expected values is computed and the values of operation request parameters may be adjusted based on the reply from the application.

In an embodiment of the invention, an application layer security method comprises the steps of: receiving an operation request to be executed by an application, identifying an application attribute of the operation request, identifying an application path associated with the identified application attribute, and directing the operation request to the identified application path. Identifying of the application path comprises comparing the identified application attribute to a predefined list of confirmed application attributes. The identified application path can be a trusted link to the application or a default application path. One or more pipes are applied to the operation request, wherein a number and each individual type of the one or more pipes are defined according to the identified application path.

In another embodiment of the invention, an application security system for protecting a trusted application comprises: an application attribute identifier that identifies an application attribute of a message directed to or from the trusted application and identifies an application path associated with the identified application attribute; a message router that routes each message to said identified application path associated with the message; and a number of security pipes, wherein a portion of the number of security pipes are associated with the identified application path and are implemented on the message upon its routing to the application path. The application attribute identifier and said message router can be employed within an application-level switch. A message identifier can be further included to compare the message to a list of confirmed messages. If the message is a confirmed message, no security pipes are applied and the message is routed to the application.

In another embodiment of the invention, an application security method comprises the steps of: classifying an application attribute of a message directed to or from a trusted application and implementing on the message a predetermined number of security pipes based on the classification of the application attribute. A comparison of the message to a list of confirmed messages can be performed and if a match results, no security pipes are applied. The list of confirmed messages may be updated as needed.

An advantage of the invention is that only legal and harmless requests will pass to a trusted network and to all the trusted applications therein. Another advantage is that the invention protects an unlimited number of applications installed on a single or multiple application servers without modifying or installing any software on these servers. Another advantage of the invention is that portions of an operation request can be scrutinized by different security techniques. Another advantage of the invention is that any combination of pipes can be applied to an application path according to the exact security needs of the application.

The invention provides a robust, scalable, dynamic, effective and elegant solution to the problem of attacks directed through the application layer.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 1 depicts the OSI model and the protocol layers that three conventional security techniques operate in;

FIG. 8 and FIG. 9 illustrate a third pipe according to an embodiment of the invention;

FIG. 10B depicts a reply message prior to being modified by the Locker pipe, according to an embodiment.

FIG. 10C depicts the reply message of FIG. 10B as modified by the Locker pipe, according to an embodiment.

FIG. 10D displays another reply message as modified by the Locker pipe, according to an embodiment.

DETAILED DESCRIPTION OF PREFERRED EMBODIMENTS

Figure 1:
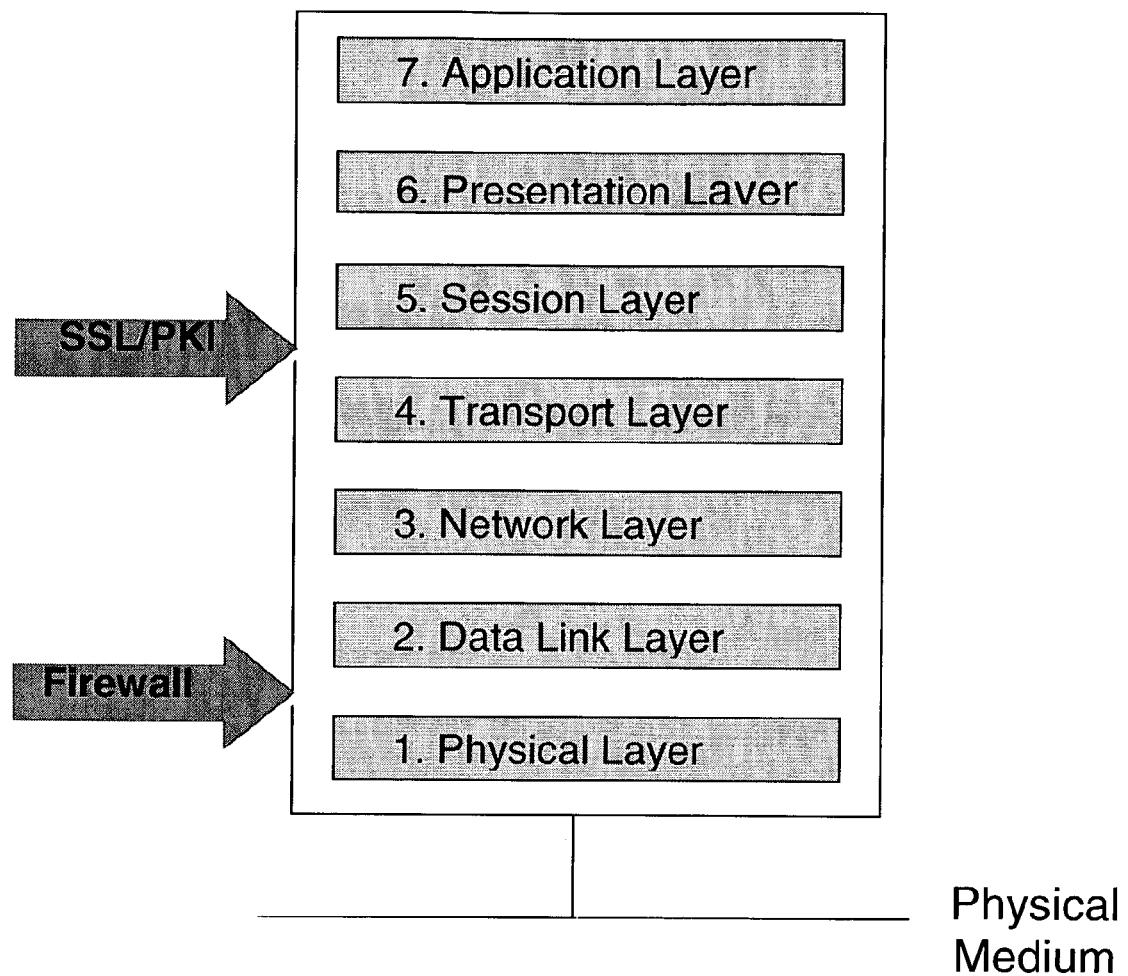

Preferred embodiments of the present invention and their advantages may be understood by referring to FIGS. 2-17. These embodiments may be employed in Internet, an intranet, a mobile communication network, an iTV network, a hybrid network, or any other application environment that uses application protocols, such as, but not limited to, HTTP, HTTPs, HTTPd, simple object access protocol ("SOAP"), web distributed authoring and versioning ("WebDAV"), and simple mail transfer protocol ("SMTP"). Nevertheless, the inventive concept can be practiced in any type of communication system where information is exchanged between a trusted application or network and a distrusted communications environment. The inventive concept is particularly suited for protecting application service provider ("ASP"), business to commerce, and business to business network environments.

The invention prevents unauthorized use of a trusted computer application or resource requested directly through the application layer. The application layer is concerned with the requirements of the application and facilitates application operations requested by a client, as opposed to lower layers, which control the transmission of data between the client and the server. Generally, all application operations use elements, e.g., parameters and associated values, provided through the application layer. An application layer security method and system according to an embodiment of the invention implements one or more security connection techniques, referred to herein as pipes, either operating alone or in combination, comprising one or more application-layer security processes that scrutinize the application content of a client message, i.e., distrusted operation request, or incoming data stream to identify illegal or harmful commands to a trusted application or surrounding environment. Thus, protecting the trusted application against application layer, particularly, web related, threats. The application layer security method and system can be implemented to protect an application, a shared application, a distributed application, or multiple applications from being requested to execute out of the intended scope of operation. Thereby, preventing such applications from harming themselves, data files, buffers, other applications, server performance, or confidentiality of information. Operation requests that are identified to be harmful or illegal can be rejected entirely or modified into, or replaced with, a harmless or legal request. Accordingly, only harmless and legal requests will pass to the application for execution.

In an embodiment of the invention, a security system is positioned in front of a trusted environment comprising one or more applications. The security system implements a protective layer at the application layer between these trusted application(s) and incoming distrusted application operation requests that are received from or through an unknown or distrusted environment. The protective layer inspects these requests for form, content, or both, to ensure that only legal and harmless requests will pass to the trusted environment. The security system may comprise hardware, software, or both, to implement the protective layer.

Figure 2A:
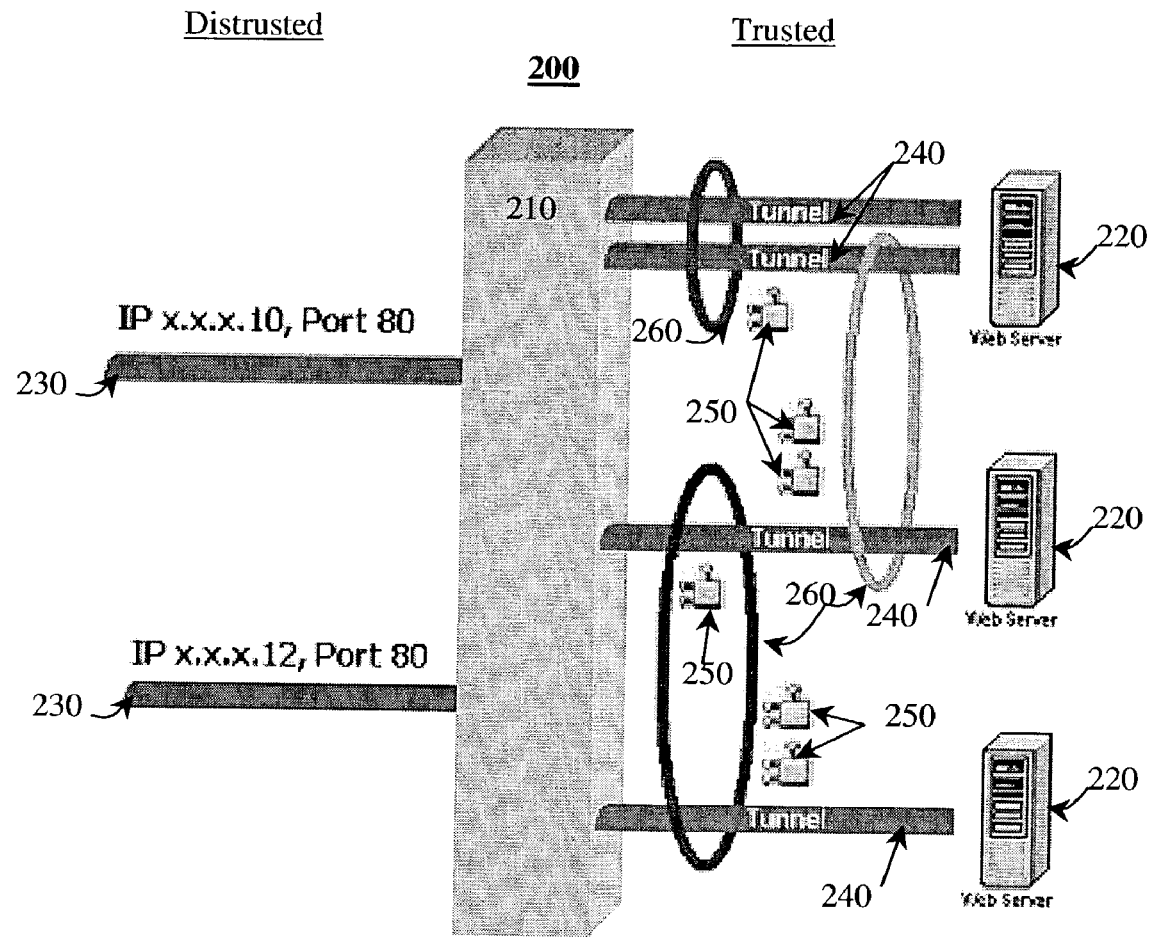
FIGS. 2A-2E illustrate an application layer security system according to an embodiment of the invention.
Figure 2B:
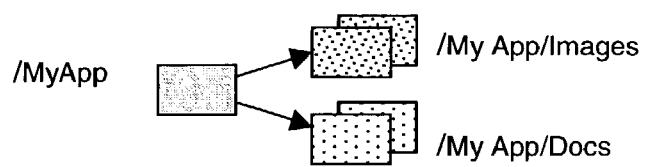

FIG. 2A illustrates an application layer security system 200 according to an embodiment of the invention. Particularly, protective layer 210 is implemented between a distrusted environment and a trusted environment comprising one or more applications (not shown) residing on one or more web servers 220. Protective layer 210 protects trusted applications from malicious operation requests sent via a distrusted source. Each incoming operation request can comprise a plurality of requested commands, parameters, and parameter values to be performed by an application. Incoming operation requests may be received as external HTTP traffic via one or more ports 230. Each application can be implemented on a dedicated or shared server, or distributed throughout multiple servers and can comprise resources, such as, but not limited to HTML documents, web server software, common gateway interface ("CGI") scripts, Perl scripts, database information, or any type of information resource or executable program. An application path represents an application's resource location to execute a specific application task or command. The resource location can be a physical or virtual address residing on web server 220. For example, FIG. 2B depicts the virtual subdirectory "/My App" consisting of subdirectory "/My App/Images" and "/My App/DOCS." Each one of these subdirectories represents an application path designating the location of respective images or documents.

Security system 200 comprises tunnels 240 to support single, distributed, or shared applications. Tunnels 240 are protocol based, e.g., TCP/IP, connections between the distrusted and trusted environments. Network traffic comprising incoming or outgoing data packets traveling through each tunnel is separated based on appropriate application paths derived from the application content of the data packets. For example, in HTTP, an application path can be a virtual directory defined on web server 220 that can be accessed via a specific tunnel. Each tunnel 245 can implement and validate a specified application protocol, such as, for example, HTTP, HTTPs, SOAP, WebDAV, FTP, Telnet, and the like. Alternatively, each tunnel 240 can simply forward incoming and outgoing data packet streams.

Figure 2C:
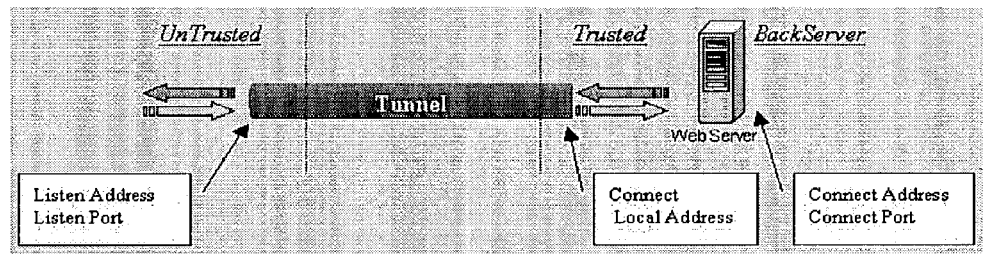
Figure 2D:
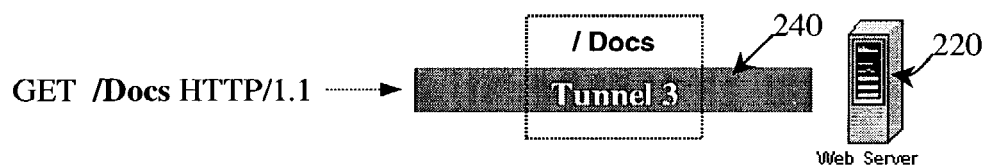

FIG. 2C depicts exemplary tunnel 240 that communicates information between a listen address and port on the distrusted network side, and a connect local address on the trusted network side. The listen address and port receives incoming application operation requests. The connect local address receives information received through tunnel 240 and forwards it to the back-end application listening at its connect address and port. FIG. 2D depicts an exemplary tunnel implementation of tunnel 240, specifically referred to as tunnel #3, which is associated with subdirectory/DOCS. In this example, a request for the display of an application comprising certain documents, e.g., application command GET/DOCS in HTTP protocol, is transmitted through tunnel #3 to a corresponding application.

System 200 further comprises one or more pipes 250 provided to protect or monitor functionality of the applications. Particularly, one or more pipes 250 are executed on traffic running in a tunnel. For example, a first pipe protects an application(s) from known vulnerabilities, a second pipe prevents database manipulations, and a third pipe prevents parameters poisoning. Specific pipe embodiments and implementations are described in detail in the following description. One of skill in the art recognizes that additional pipes can represent other specific or general security concerns.

Figure 2E:
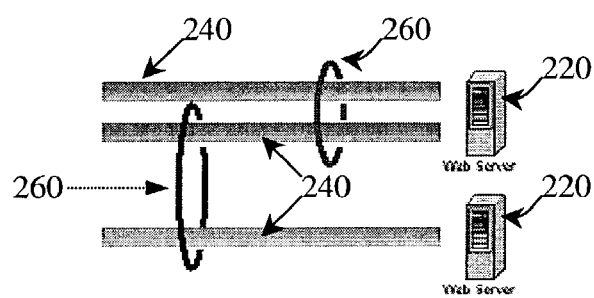

Referring to FIG. 2A and particularly FIG. 2E, system 200 comprises one or more web applications 260, which are logical entities wrapping or grouping two or more tunnels 240, application paths, and one or more pipes 250 that together protect a trusted application. When protecting an application distributed among several web servers 220, i.e., separate HTML pages reside on different machines, a single web application entity represents the distribution. For example, web applications 260 scrutinize and monitor all traffic over selected application paths. A default web application is a logical entity representing security protection on all traffic over all tunnels not defined in web applications 260. Further, web applications 260 can customize pipe(s) execution to specific application paths.

Security system 200 can comprise hardware, software, or both to implement protective layer 210. In an embodiment of the invention, protective layer 210 is implemented on a stand-alone server. In an alternative embodiment, protective layer 210 is implemented as "plug and play" hardware, or the like, that can be installed on an existing server. In another embodiment of the invention, protective layer 210 is implemented by software components that are installed on one or more servers.

In an embodiment of the invention, an application layer security method comprises the step of inspecting the contents of incoming and/or outgoing messages or data packets to identify application commands or parameters associated with a trusted application executing out of its intended or authorized scope. Message contents comprise a message header, message body, query string, and the uniform resource identifier ("URI") and particularly the application layer elements, such as application variables and commands, which the application will execute or interpret. Content checking comprises the step of applying one or more pipes, wherein each pipe provides a specific protection or monitoring functionality, to the application layer content.

In an embodiment of the invention, a security method 300 is employed to scrutinize the application layer contents of incoming application operation requests. Referring to the left side of FIG. 3A, application path identification and tunnel construction is first performed (steps 302-322) on an incoming operation request. Particularly, an operation request in the form of a data packet or stream of packets sent from a distrusted network is first received (step 302) at a receiving means, such as, preferably a queued socket server, which prevents denial of services caused by buffer over-flow attacks, i.e., a large number of redundant or illegal requests that are received in a given time exceed the number that a server can handle, thereby causing a denial of service to legal requests or allowing overflow requests to proceed unauthorized. In other embodiments, other conventional receiving means able to receive and handle data communication may be used, the identification and implementation of which is apparent to one of skill in the art. Upon reception of the request, a binary stream reader reads (step 304) the data packets from the server queue. In a preferred embodiment, an internal entity, i.e., a network session object, handles each message during its lifetime in the system.

A protocol message constructor constructs (step 306) the received operation request, which may be initially formatted according to any type of protocol, into an internal message having a desired format designated by a protocol specification 307. Protocol specification 307 may be any type of application protocol, such as HTTP, HTTPs, SOAP, HTTPd, FTP, WebDAV, and the like, which is implemented by a trusted application. Internal message construction is also referred to as tunnel construction, where the operation request is embedded into a data format of the protocol of the trusted application. In an embodiment of the invention, if the operation request can not be formatted into an internal message because of, such as, the inability to create a legal protocol message due to, for example, missing or extra parameters, the operation request is immediately rejected. Upon successful formatting into an internal message, the message is indexed (step 308) and stored for later analysis, thereby permitting application content to be gathered from the request if necessary and accumulated in a temporary buffer or permanent storage device. As the following discusses in greater detail, gathered content is useful for comparison with a corresponding reply returned from an application's execution of the request or to subsequent other operation requests and replies.

If rejection does not occur, the message is translated (step 310) into a known encoding language that is understood by the pipe components. The known encoding language can be any type of encoding language. In a preferred embodiment of the invention, the encoding language used is Unicode or enhanced Unicode. Unicode is particularly preferable when using a HTTP application protocol. In operation, a request is translated into Unicode characters. For example, if a received request is encoded in American Standard Code for Information Interchange ("ASCII") or any other encoding standard, the message is translated into Unicode or enhanced Unicode. Translation provides an isolated and independent inspection of the operation request by determining if any symbols contained in the request are unexpected. In other words, any request that contains unexpected characters may be rejected in its entirety. Translation ensures that the subsequent security process is performed on an expected encoding standard, thereby minimizing the risk of security compromises due to unexpected characters. Moreover, translation isolates the original message from the translated message to ensure that all pipes will execute properly on the translated message. In an embodiment of the invention, any update of protocol specification 307 leads to an immediate update of the known encoding language. In other embodiments, ASCII or any other encoding standard may be used as the encoding language.

Successful constructing, indexing, and translating results in the conversion of a distrusted operation request into a well-formatted protocol message encoded in Unicode. These steps act as a preliminary screening of the format of the request before the requests are passed along for intensive scrutiny of the contents by applying one or more pipes. Alternatively stated, these steps filter out requests that are blatantly surprising or unexpected before checking a request's contents for concealed or not readably identifiable illegal or harmful commands.

Following translation, each command or parameter, or a portion thereof, within an operation request is identified (step 312) along with its intended application path, and then related (step 314) to a logical managed entity, i.e., web application, employing a specified routing scheme. In an embodiment of the invention, a command is routed (step 316) according to the routing scheme if its identified application path is known, i.e., a match was found with an application path associated with the web application and routing scheme. If the command's application path does not exist or can not be completely identified, or does not match any known application path, the message is routed (step 318) through a default tunnel, which preferably applies all available pipes for maximum security. The default tunnel may also be applied to any message that was found to have a security problem during initial tunnel construction. Implementation of the default tunnel may trigger display of an error web page, security alert web page, or similar means to notify that an error has occurred or that a presumed malicious attack has been redirected away from the trusted application. However, if a default tunnel is not specified, then the request is denied (step 320). Each command or parameter corresponding to an appropriate application path is routed according to the routing scheme, thereby routing each command through a designated tunnel, which in turn applies a specified number and combination of pipes for that application path. Steps 312-320 are repeated for additional commands and parameters contained within the operation request (step 322).

Figure 3A:
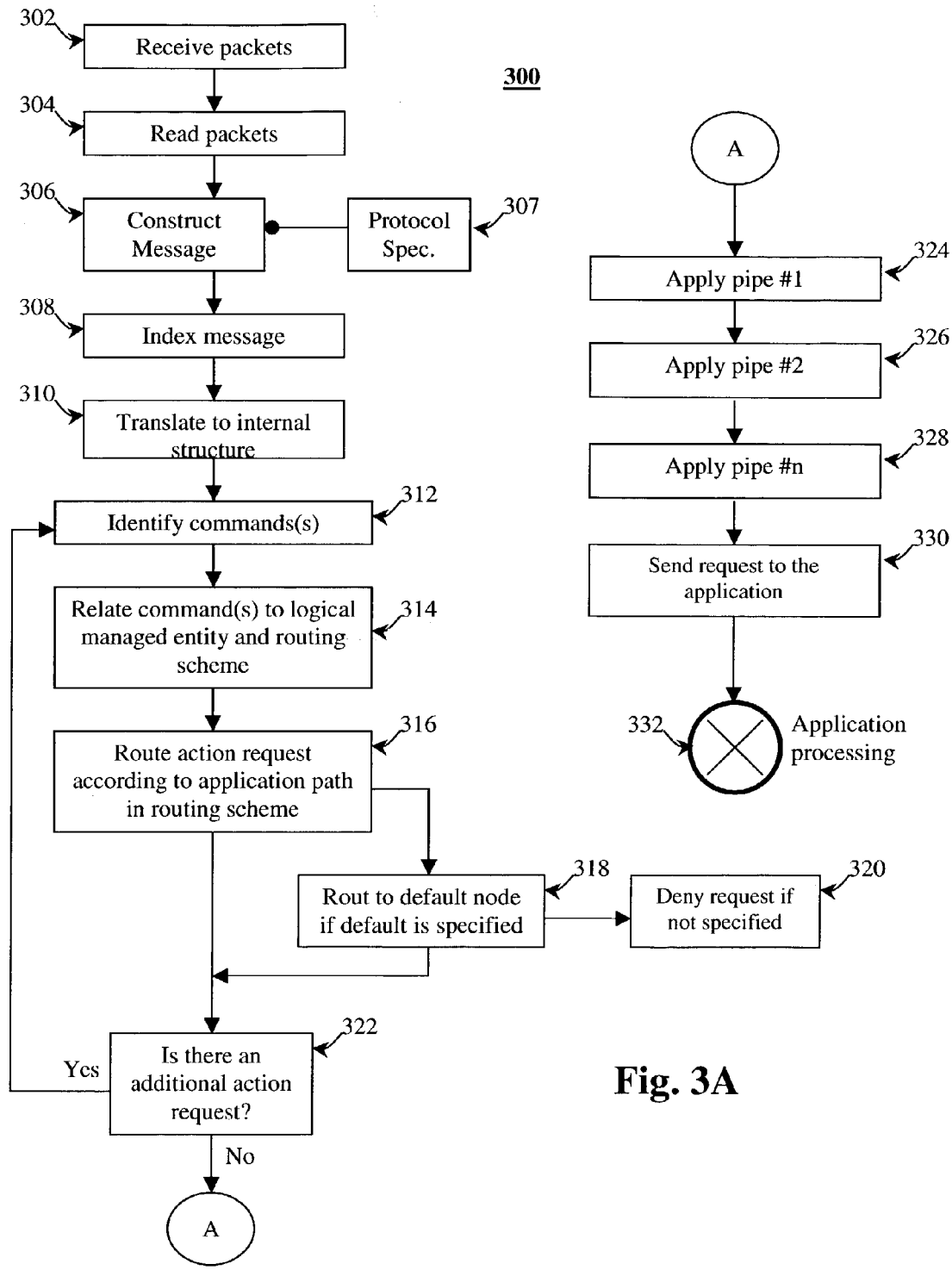
FIGS. 3A-B illustrate an application layer security method according to an embodiment of the invention.

Referring to the right side of FIG. 3A, one or more pipes are then applied sequentially (steps 324, 326, and 328), as determined by the routing scheme, to each incoming operation request to intensively scrutinize the application layer contents, such as, instructions, commands, query string, environmental variables, and parameters contained within the request. Each pipe provides a unique type of analysis or monitoring functionality. The specific number and types of pipes applied are dependent on the amount of security desired and typically for the type and needs of each tunnel and/or application path. For example, one tunnel may have three pipes applied, while another tunnel may have two applied.

Pipes are generally categorized as static or dynamic, either of which can optionally implement a "learning" technique as will be described. Static type pipes typically scrutinize the application contents through comparison with statically stored information that is related to hacking patterns or known, i.e., identified, vulnerabilities. For example, if a match is found through the comparison, the request can be rejected, modified, or replaced. Dynamic type pipes scrutinize both the incoming requests and outgoing replies, and the possibly changing, i.e., dynamic, relationship between them. Either of these type of pipes may apply a learning technique that gathers information from requests and/or replies to "fine tune" a pipe's scope of security. Nevertheless, a single pipe may combine a number of characteristics associated with static and dynamic type pipes, with or without a learning technique. Specific pipe configurations and implementations are described in the following description. Upon application of the appropriate number and types of pipes, the legality and/or harmfulness of the application contents of the operation request is determined. If the operation request passes scrutiny, the request is sent (step 330) or at least allowed to proceed to the trusted application for processing (step 332).

Figure 3B:
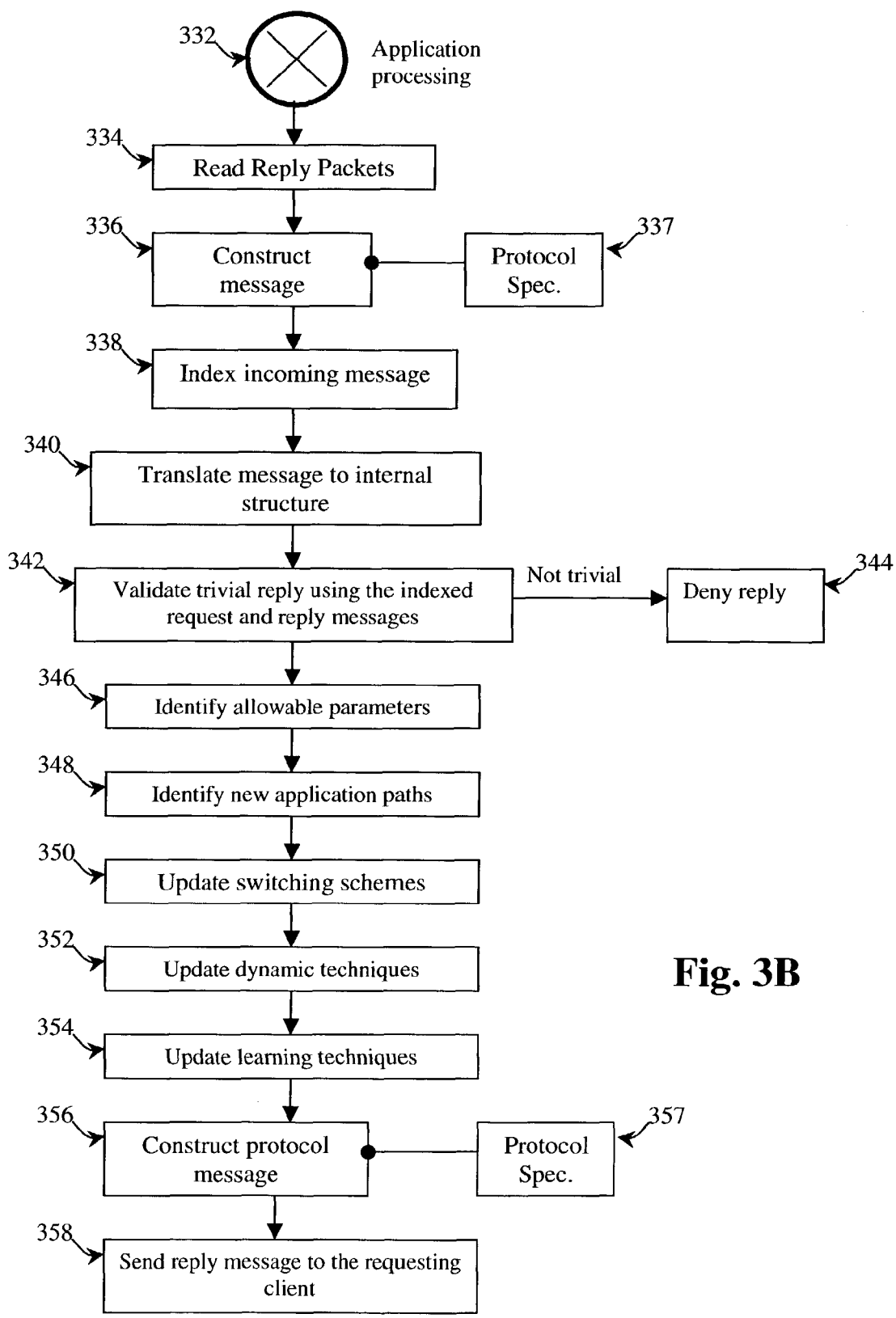

In a typical client-server communication session, once the application processes an operation request, a respective reply is generated for return to the requesting client. For example, the reply may be a HTML document, image, database information, video, or any other resource accessible through a server. Referring to FIG. 3B, the steps of method 300 that occur after the execution of the operation request are shown. The outgoing reply is read (step 334) and then constructed (step 336) into an internal message based on a specified application protocol 337. In a preferred embodiment of the invention, application protocol 337 is identical to application protocol 307. If any of the pipes applied to the incoming operation request require inspection of the return reply, then steps 338-356 are performed. Particularly, the reply message is indexed (step 338) back to the original request if comparison between the two is necessary for any of the pipes implemented. Upon indexing the message, the reply message is translated to (step 340) the encoding language used on the incoming data stream. An outgoing reply is validated (step 342) using the translated indexed request stored previously and the translated and indexed reply message. Particularly, this step ensures that the outgoing reply is trivial in nature. For example, the reply may contain only information that is authorized for release from the server. A non-trivial reply is denied (step 344) from reaching the client. Allowable parameter names and values as well as new application paths are identified (respective steps 346 and 348) in the reply. This information is used to update appropriate dynamic type pipes or implemented learning techniques (steps 350, 352, and 354). Upon updating, the reply is reconstructed (step 356) into a message according to protocol 35, if necessary, and is sent (step 358) to the client requesting the operation. In a preferred embodiment, protocol 357 is identical to protocol 307. If the operation request did not have any pipes applied that require inspection of the reply, steps 338-356 are skipped.

Figure 4A:
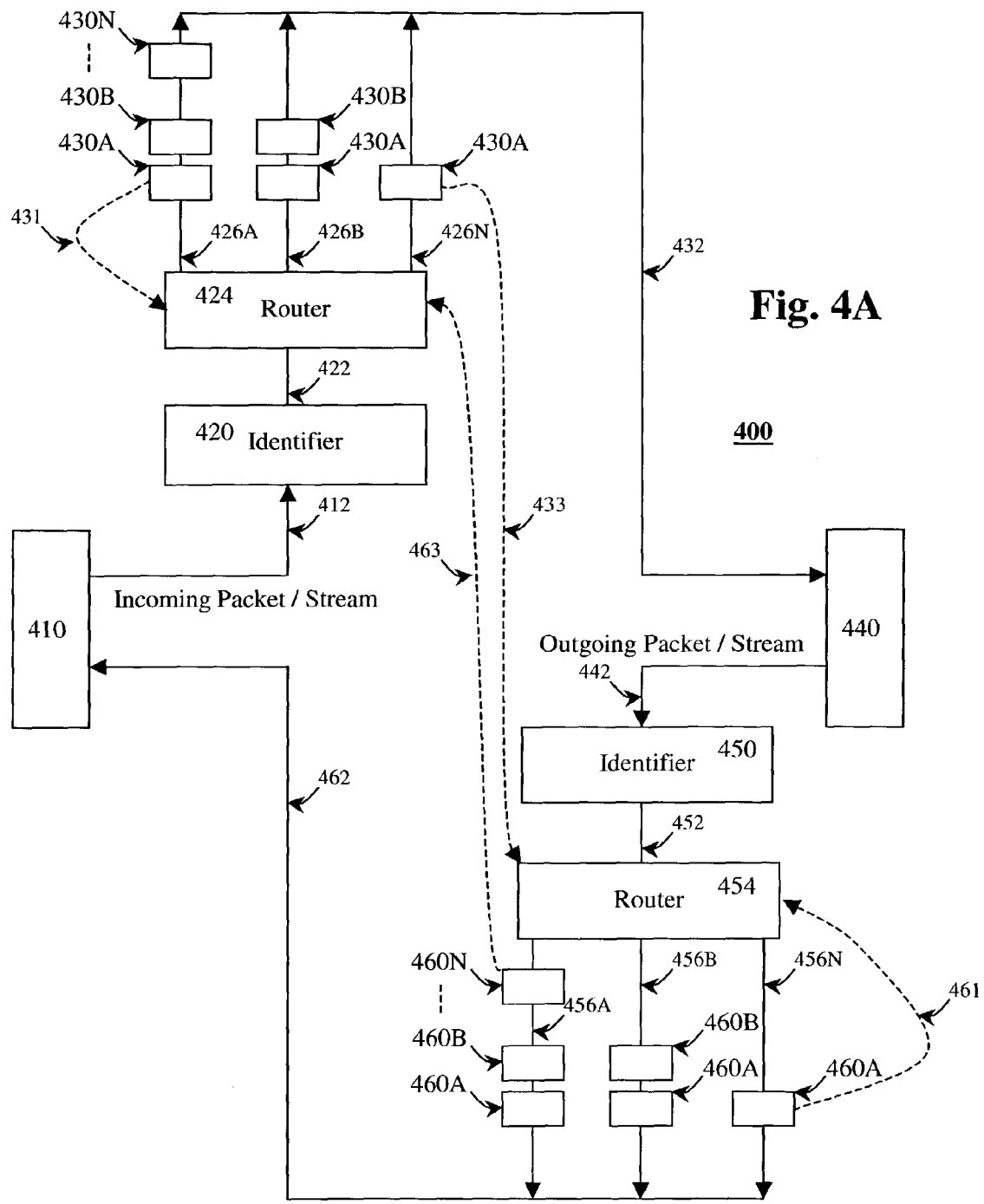
FIGS. 4A-C illustrate an application layer routing system according to an embodiment of the invention.

FIG. 4A illustrates a security system 400 for routing application operation requests or replies received or identified in a packet or stream of packets coming from the application server or from the client. Particularly, system 400 comprises a client 410, a request identifier 420, a request router 424, N number of pipes 430A-N, a server 440, a reply identifier 450, and a reply router 454. Client 410 is presumed to be located in a distrusted network. Server 440 resides in a trusted network and hosts the interactions of client 410 with one or more applications (not shown) residing on server 440 or additional distributed servers (not shown). In operation, an incoming request comprising a packet or stream of packets transmitted by client 410 is forwarded to request identifier 420 via communications link 412. Request identifier 420 identifies one or more application attributes, such as, but not limited to commands, parameters, or portions thereof, in the request. Identified application attributes are then forwarded to request router 424 via communications link 422.

Request router 424 directs each application attribute or the entire request itself to an appropriate one of application paths 426A-M, where M is the number of unique or specified combinations of pipes 430A-N that may be applied. For example, as shown, application path 426A applies all N pipes to an operation request, whereas application path 426B applies only two pipes. However, any combination of pipes can be applied to each application path. The total number of application paths, M, and pipes, N, are not necessarily equal. In a preferred embodiment of the invention, request router 424 employs a routing scheme that determines the appropriate application path for each application attribute based on, for example, the type of operation requested, the type of command, parameter name, parameter value, the specific application being requested, requested application path, client identification, or a combination thereof. Moreover, request router 424 may direct an application attribute or the entire request itself received from a specified or unidentifiable client address to a default application path that applies, for example, all available pipes. For certain pipes, such as pipe 430A, information ascertained from application of the pipe on a request or attribute is used to dynamically modify the routing scheme employed by request router 424 via communications link 431. This routing scheme may be similarly modified by information ascertained by a pipe operating on an outgoing reply via communications link 463. Moreover, updates or modifications to the routing scheme may be received from a source (not shown) external to system 400. Upon application of all appropriate pipes to the sub-components, e.g., parameters and the like, of an operation request, the operation request is forwarded to server 440 for processing if all sub-components are deemed acceptable. The request router 424 classifies the identified application attributes of an operation request and forwards them to an application path or to a default application path for further inspection. The nature of this approach provides a positive security model where only known attributes are allowed to pass to the application and unrecognized application attributes are either rejected or directed to a default application path (unlike an antivirus approach where everything is allowed except for negative patterns).

An outgoing reply comprising a packet or stream of packets, resulting from the processing of a request, undergoes similar scrutiny as the incoming stream. Particularly, the outgoing packet or stream of packets generated by server 440 is forwarded via communications link 442 to reply identifier 450, which identifies application attributes such as, but not limited to parameter names and values, or any other relevant application layer attributes, contained therein. These identified parameters and elements are forwarded to reply router 454 via communications link 452. Reply router 454 directs each element to an appropriate one of application paths 456A-M, where M is the number of unique or specified combinations of pipes 460A-N that may be applied to each outgoing parameter or element. A portion of pipes 460A-N can be identical to a portion of pipes 430A-N. In a preferred embodiment of the invention, reply router 454 employs a routing scheme that determines the appropriate application path for each request, parameter, parameter value, or element based on, for example, the type of reply, the type of parameter, the value of the parameter, the type of element, the application that generated the reply, identification of the client receiving reply, or a combination thereof. The reply routing scheme may be, but not necessarily, identical to the routing scheme employed in request router 424. Information ascertained by a pipe, such as pipe 460A as shown, on an outgoing parameter or element can be used to modify the routing scheme implemented by reply router 454 via a communications path 461. Moreover, information ascertained by pipe 430A operating on an incoming request can dynamically modify this routing scheme via communications path 433. Moreover, updates or modifications to the reply routing scheme may be received from a source (not shown) external to system 400. Upon application of all appropriate pipes 460 associated with application path 456, acceptable results are returned to client 410 via communications channel 462.

The above embodiment is illustrated with communication links 422, 433, 452, and 463 appropriately connected to request identifier 420, request router 424, reply identifier 450, or reply router 454. In an embodiment of the invention, identifier 420, request router 424, reply identifier 450, and reply router 454 may be implemented as software separate from pipes 430 and 460, which are implemented as either software or hardware. For instance, communication links 422, 433, 452, and 463 are not actual physical connections, but virtual connections between software modules. Communications links 412, 432, 442, and 462, as well as any other link identified herein, may be any conventional communications medium, the implementation of which is apparent to one of skill in the art. In an alternative embodiment, request identifier 420, request router 424, reply identifier 450, and reply router 454 are implemented into a single hardware component with or without pipes 430A-N and 460A-N.

In one embodiment of the invention, system 400 employs an application-level switch to implement the functions of request identifier 420, request router 424, reply identifier 450, and reply router 454 as described above. An application-level switch is a device that directs incoming traffic to a specific target server based on a pre-defined list, or switching table, of one or more application level attributes identified in the incoming request (unlike a network switch that does the same based on network level attributes), the implementation of which is apparent to one of ordinary skill in the art. Consider an exemplary scenario where a web application has a single HTML page called Login.html and two image files (x.gif and y.gif). The Web application is deployed using two web servers, one of which holds the Login.html file (e.g., a HTML files server) and the other holds the two image files (e.g., an image files server). An application-level switch is installed in front of the two web servers and configured to switch all requests for images to the images server and all requests for HTML files to the HTML files server. If a remote user sends a request to the web application requesting the x.gif file, the application-level switch obtains the application attributes from the user request—in this case x.gif—and switches the request to the image files server as its final destination. Note: a valid request includes both network and application attributes. Any remote user request with application attributes that do not match the switching table (e.g., HTML or Images) will be rejected entirely or switched to a pre-defined default location.

Figure 4B:
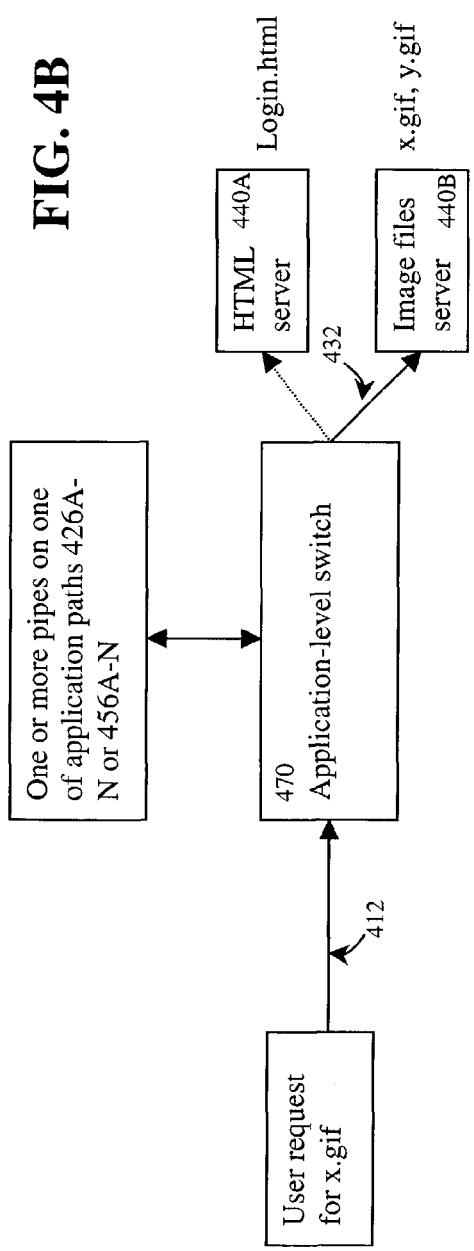

FIG. 4B illustrates an application-level switch 470 topology for implementing the reply and request routing schemas and the identifier processes employed by request identifier 420, request router 424, reply identifier 450, and reply router 454 as described above. Using this topology, the application-level switch 470 fetches one or more application attributes from a request or reply and switches the destination of the request or reply based on such attributes to an appropriate application path, such as one of application paths 426A-N or 456A-N in system 400, where any desired combination of pipes 430A-N and/or 460A-N are subsequently applied. If the fetched application path attribute is not included in the schema, application-level switch rejects 470 the request or reply. Using this approach, performance is improved and a positive security model is achieved as only confirmed, i.e., expected, requests and/or reply messages are processed in the security system 400. Referring again to the exemplary scenario set forth above, two servers, e.g., HTML server 440A and image files server 440B, are provided and a routing schema defines that requests with image attributes are switched to application path 426B (request with HTML attributes are switched to the application path of HTML server 440A). Therefore, if a request for x.gif is received, application-level switch 470 switches this request to an application path 426B where pipes 430A and 430B are applied, and then if the request is subsequently deemed acceptable based on the application of these pipes, the request is communicated to image files server 440B.

It is important to note that because any combination of security pipes can be applied to each application path, i.e., the type and strength of security can be tailored to particular types of application attributes using application-level switch 470. In other words, application-level switch 470 classifies application attributes in order to implement a security method tailored for each application attribute classified.

Figure 4C:
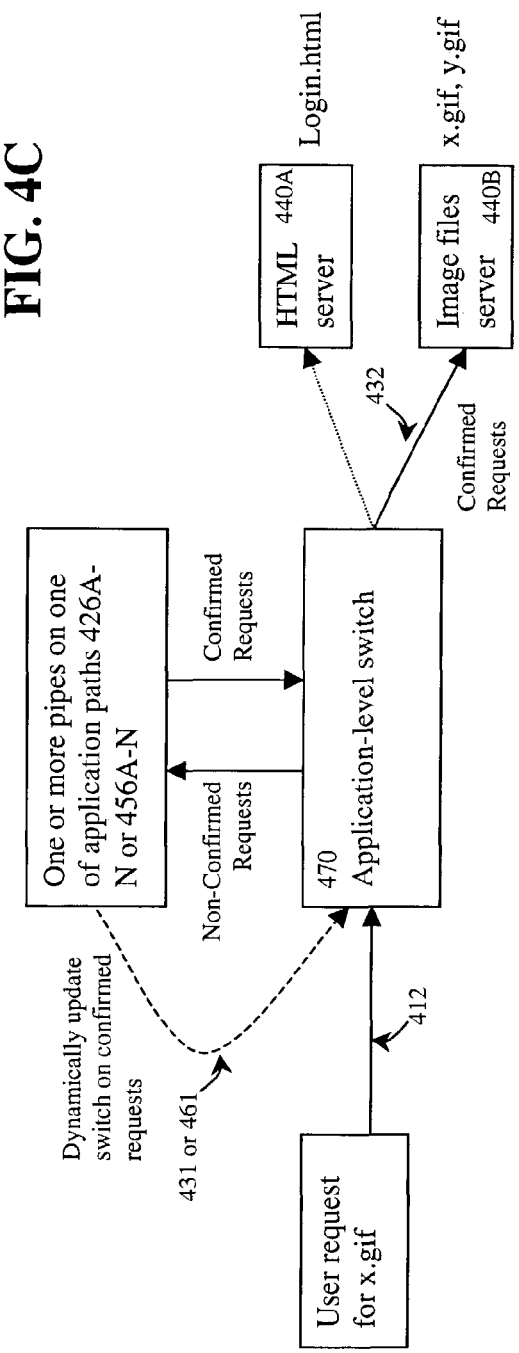

FIG. 4C illustrates another application-level switch 470 topology wherein a list of confirmed requests and/or replies is dynamically updated in the application-level switch. Particularly, application-level switch 470 fetches application attributes from a request (or reply) and compares them to the list of application paths 426A-N (or 456A-N) and to accepted requests (or replies) defined as confirmed requests (or replies). If the incoming request is deemed a confirmed request, i.e., a request available in the list in application-level switch 470, application-level switch 470 forwards it directly to the appropriate server without any further pipe processing. If the incoming request does not match any of the confirmed requests in application-level switch 470, the application-level switch 470 directs the request to an appropriate application path 426A-N (or 456A-N) for further pipe processing. Upon processing, an acceptable request can be defined as confirmed and accordingly, added to the list of confirmed requests in application-level switch 470, such that subsequent identical requests are treated as confirmed requests. In other words, the application-level switch 470 is dynamically updated with newly confirmed requests via link 431 or 461 such that future incoming requests from the user are processed solely by the application-level switch 470 without requiring additional pipe processing. Using this approach, positive security functionality is achieved as application attributes are set in the switch, thereby allowing trusted requests to be switched to the application while processing all other requests as distrusted requests.

The application-level switch topologies introduced above can be implemented in combination with any other non-security products that manage, switch, rout and/or balance traffic based on application-level attributes.

Figure 5:
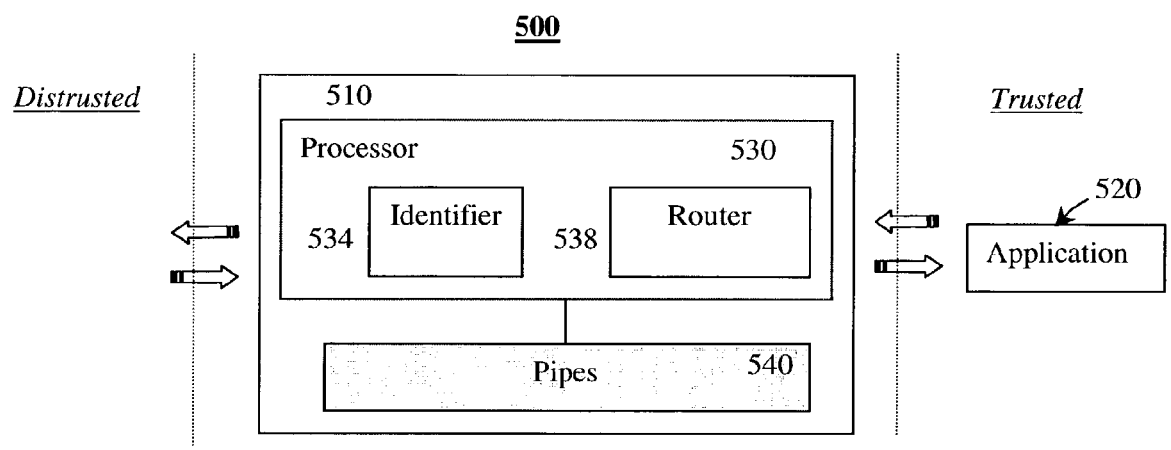
FIG. 5 illustrates an application layer security system according to an embodiment of the invention.

FIG. 5 illustrates a security system 500 having a hardware configuration according to an embodiment of the invention. Particularly, security system 500 comprises a security module 510, which is positioned in between trusted computer application 520 and a distrusted network environment. Module 510 implements a protective layer to prevent unauthorized use of application 520. In an embodiment of the invention, module 510 comprises a processor 530 and pipe logic 540. The term processor denotes any logic, circuitry, code, software, and the like that is configured to perform the functions described herein. Processor 530 performs initial tunnel construction, indexing, and translation as described above by implementing internal entities that isolate the operation requests received via the distrusted environment from application 520. The internal entities escort the distrusted requests to identifier and router 534 and analyzer 538. Identifier and router 534 applies every existing application path on the incoming request stream, or outgoing reply stream if necessary, to identify the operation request's desired destination in the application, as well as the parameters and values, if any. Analyzer 538 applies one or more pipes stored in pipe logic 540 to an operation request, or portion thereof.

Exemplary Pipe Descriptions

The following represents a detailed description of exemplary pipes that can be applied alone, or in combination, to incoming operation requests and outgoing replies. Additional pipes not mentioned herein, such as security processes directed toward conventional techniques, can be applied, the identity and implementation of which is apparent to one of skill in the art.

1. Marabu

In an embodiment of the invention, a first pipe, herein referred to as "Marabu," is applied to one or more application paths. Marabu is a content driven pipe aimed at finding patterns that show malicious intentions in an operation request. Marabu is preferably applied to application paths involving database operations. Particularly, Marabu inspects an incoming request's application contents for permitted syntax based on the type of requested database and the existence of one or more embedded harmful SQL commands. Harmful commands are identified by the failure to find a match to a plurality of stored database commands deemed acceptable for the type of requested database, e.g., SQL type database or Oracle type database. If a match to an acceptable command is not found, the request will be rejected or reengineered, i.e., modified, into or replaced with an acceptable form that is legal or harmless. This pipe catches well-formed and partial SQL commands that are deemed to be harmful to the database or its environment.

In an embodiment of the invention, a database query parser engine is implemented to identify the form and function of each expression of the operation request. The parser engine parses out individual expressions, i.e., elements, for separate analysis. Marabu focuses on ensuring that the syntax of each expression is straightforward and credulous by applying a 'state-automate' and limited alphabet. Particularly, Marabu employs a method to enforce proper syntax comprising the steps of: building a state-automate; inspecting each and every expression according to permitted syntax and a limited alphabet, and applying the state-automate to each and every expression. The state-automate is a correlation of nodes representing present and other possible states of the application. Each node may have connections to other nodes based on the expressions that would change the state of the application. For example, a first node representing a present state of the application is connected to another node representing a possible state reached from the present state when a particular expression, e.g., a DELETE command, is executed. All connections are presumed to be one-way connections, i.e., once a state changes to another state, that change is irreversible.

In an embodiment of the invention, the alphabet contains: letters, digits, and other encoded characters, for example: a, b, c, _, ', etc.; blocks of letters, such as DELETE or ALTER; and groups of blocks, such as an SQL group comprising DELETE, ALTER and CREATE as members. Each expression within an operation request is scanned one or more times.

If each expression consists of sequences of letters and digits identified as acceptable, the request is approved and pipe execution stops. If an expression does not consist of acceptable sequences of letters and digits, the remarks, particularly, the database specific character that represents a remark, such as MSSQL—/* */ or --, inside the expression is omitted and the expression is inspected by applying the state automate. Every predefined alphabet letter associated with an expression or a function argument moves the current state of the automate to a connecting possible state.

In an embodiment of the invention, different processes are implemented depending on the type of state reached when applying the state automate. For example, if the state automate reaches a Boolean-state, the expression can be checked for "always-true" expressions, such as '15'='1'+'5' and '6>5 OR 5=5'. Always-true expressions may trick a database into accepting a request when it normally shouldn't. Expression trees enable the identification of an always-true expression. Particularly, the expression is recursively broken into a tree having nodes as operators, e.g., AND, OR, =, and the like, or variables such as a field. After the tree is built, different expression values are inserted. A post-order scan will eventually lead to a TRUE or FALSE determination. Wisely sampling values to the variables will cover the range of all possible solutions, thereby determining if the expression is always true, and hence the rejection of the request. If the state automate reached a SQL-state, the expression is validated using SQL prototypes stored in a dictionary. The prototypes are implemented using a graph of different states connected by arcs. Two-way-arcs will allow recursive expressions, i.e., states with arcs pointing to themselves, and 'stretching' in order to try to fit the input. If the state automate reaches a trap-state, the expression is denied and execution of the pipe is halted. If none of these states occur or inspection of the above states does not result in denial of the expression, the expression is approved and pipe execution stops.

Figure 6:
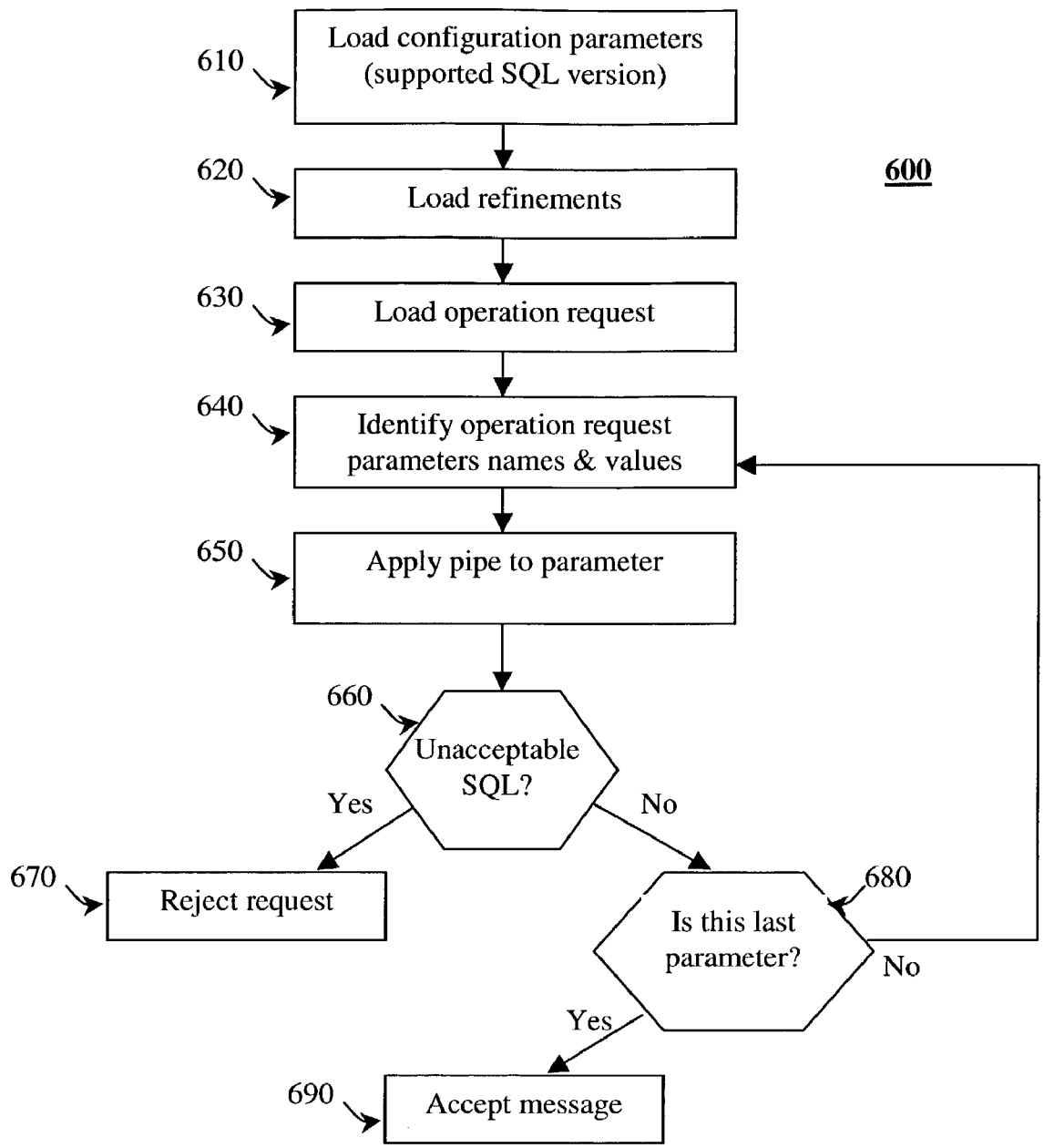
FIG. 6 illustrates a first pipe according to an embodiment of the invention.

FIG. 6 illustrates a process 600 for implementing the Marabu pipe according to an embodiment of the invention. Particularly, configuration parameters for the supported database, e.g., based on the type of SQL version, are loaded (step 610) into a processor. Optionally, any refinements to these configuration parameters are loaded (step 620). The operation request is loaded (step 630) and parsed into elements to identify (step 640) expressions, e.g., parameter names and values, contained within the operation request. Marabu pipe is then applied (step 650) to each parameter to determine (step 660) if embedded SQL commands are acceptable. If not acceptable, the entire operation request can be rejected (step 670). If acceptable, it is determined (step 680) whether or not that parameter is the last parameter. If that parameter is not the last parameter, steps 640-680 are repeated. If the parameter is the last parameter, and no illegal or harmful SQL commands are identified, the operation request is accepted (step 690) and allowed to proceed.

The following are two common types of database attacks that are generally wide spread across the Internet and are typical of manipulation type attacks, which can be caught by this pipe. The first represents a request to delete all records in a table. For example, in the delete all records attack, an original link, such as http://www.yoursite.com/phones/phonelist.cgi?phoneid=34 which executes a SQL command on a database server to select and report the contents of "http://www.yoursite.com/phones" where "phoneid" equals 34, may be changed into a modified link concatenating a DELETE command, such as http://www.yoursite.com/phones/phonelist.cgi?phoneid=34;DELETE The latter executes a SQL command on the database to delete the contents of "http://www.yoursite.com/phones" where "phoneid" equals 34. In applying this pipe, the DELETE command is recognized as an unauthorized command and hence, may either reject the request entirely or replace the request with a legal request such as the original link not containing the DELETE command. In the following second type of illegal request, login is attempted without using a password. For example, an original link, such as http://www.yoursite.com/logon.asp?login=yourname; pws=123 executes a SQL command on the database server to select a name from a user list where login='yourname' and the password='123'. A modified link adds an 'always true' Boolean phrase, to trick the application into accepting an invalid password, for example http://www.yoursite.com/logon.asp?login=yourname' or '1'='1'; pws=8 executed a SQL command on the database server to select a name from a user list where login='yourname' or '1'='1' and the password='123'. When applying this pipe, the '1'='1' partial command is recognized as invalid and the request is not allowed to achieve its intended execution.

Full database protection is provided against users and client applications manipulating an application database. Marabu pipe acts as a shield against data manipulation that can damage information stored within the database. Further, it provides database system administrators with an additional level of protection when combined with other pipes and it ensures that application bugs will not affect a back office database.

2. Minime

In an embodiment of the invention, a second pipe, herein referred to as "Minime," is applied to one or more application paths. Minime is a deterministic pipe that inspects an incoming operation request for known vulnerability patterns. In a particular embodiment of the invention, all known application vulnerabilities, specifically the respective requests that take advantage thereof, are stored and compared to the incoming request. If a match if found between any portion of the incoming request and any portion of the information stored, the incoming request is blocked and is not allowed to proceed to the application. Further, the pipe may shield applications against unknown or not readily identifiable vulnerabilities by eliminating the use of scripts, commands, methods, and executables, e.g., format.exe, which formats a storage space, or cmd.exe, which enables a command-line input prompt, if accessed or executed, will negatively affect or allow illegal access to the application environment or servers.

In a preferred embodiment of the invention, the stored vulnerability information may be updated as future vulnerabilities are identified. Particularly, the stored information may be updated with information downloaded from an information source, for example, a dedicated centralized server or multiple web servers from commercial or government sources.

In an embodiment of the invention, the Minime pipe employs an exact pattern matching method. Particularly, the method comprises the steps of: computing a hash value for consecutive characters, e.g., for every four (4) consecutive characters, in an operation request and comparing each computed hash value against a list of hash values associated with improper requests. In operation, the first four characters of an operation request is inputted into a four (4) character window. Each of the four characters is converted to an 8 bit binary code, for example:

abcd=[01000001][01000010][01000011][01000100]

A first hash value is then calculated from the 32 bit string (4 characters×8 bits/character). A second hash value is calculated by shifting the window one (1) character, i.e., characters 2 through 5. A third hash value is calculated by shifting the window again by one character, i.e., using characters 3 through 6. Additional hash values are calculated in such a way until all the characters in the operation request have been exhausted. Thus, if there are n characters in an operation request, n−3 has values will be calculated. Each hash value is compared to those stored and associated with improper requests. Accordingly, if a match is found, the incoming request is rejected.

In a preferred embodiment of the invention, the above method is applied to an operation request constructed in HTTP protocol. The operation request is divided into four (4) zones respectively representing a message URI, a query string, a message header, and a message body. Vulnerability pattern matching as described above is directed to one or more of the specific four zones. Because pipe application can be directed to a single zone or a portion less than the entire operation request itself, performance can be increased and false alarms decreased. If a string is determined to be a suspect, full simple string matching is performed.

Figure 7:
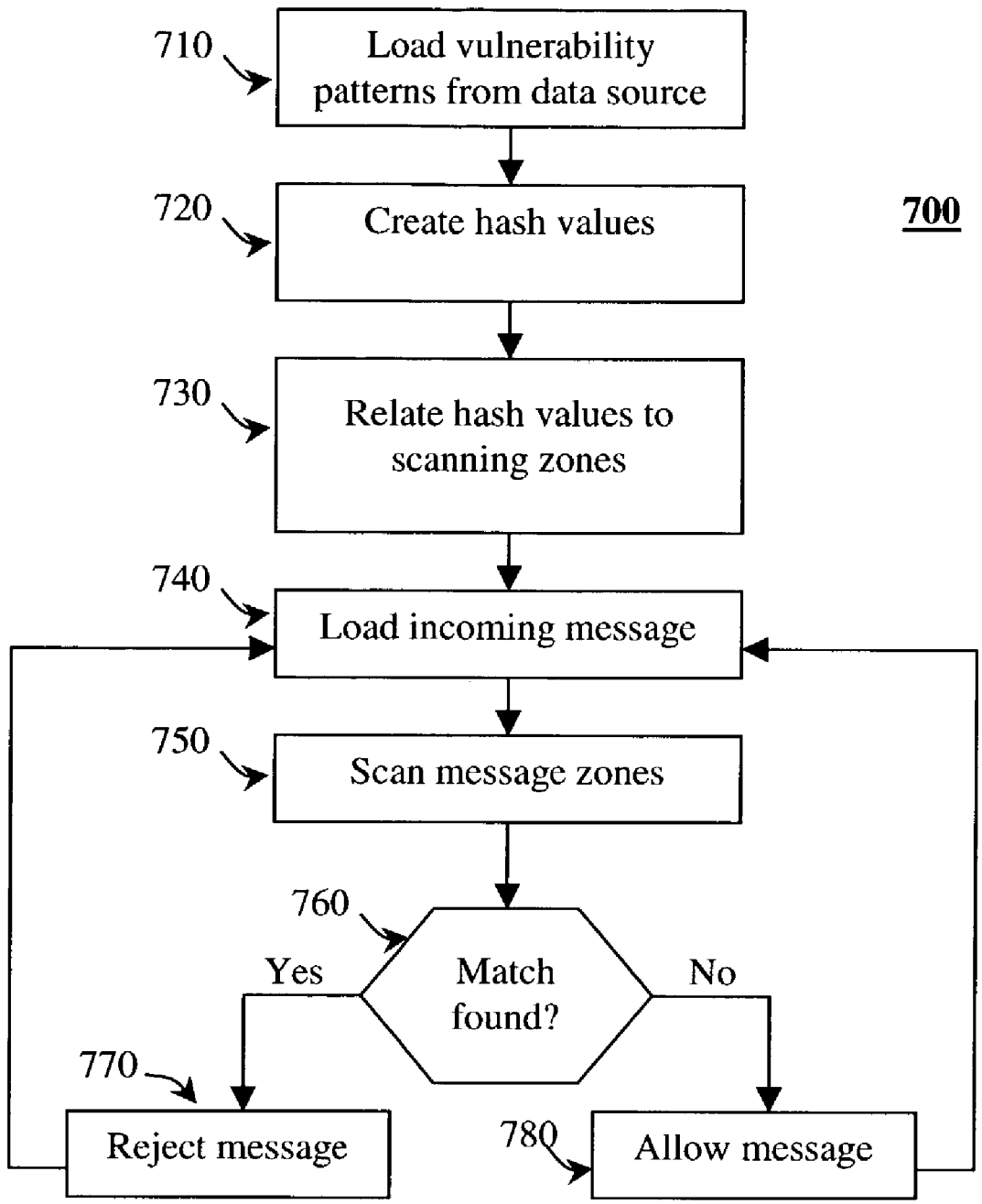
FIG. 7 illustrates a second pipe according to an embodiment of the invention.

FIG. 7 illustrates a process 700 for implementing the Minime pipe according to an embodiment of the invention. Particularly, vulnerability patterns are loaded (step 710) into a processor either from internal storage or an external database. Optionally, a table comprising has values of the vulnerability patters is created (step 720) to facilitate efficient pattern matching. Four different scanning zones are built (step 730) and associated with designated hash values to be applied. The incoming message is loaded (step 740) and one or more message zones are scanned (step 750) to determine (step 760) if a vulnerability pattern, e.g., hash value, matches. If a match is found, the message can be rejected (step 770). If a match is not found, the message is allowed (step 780) to proceed to another pipe or an application. For any subsequent operation request, steps 740-780 are repeated.

The following are three common Microsoft Internet Information Server® vulnerabilities blocked. View any file on your web server hard disk, e.g., http://www.yoursite.com/msadc/Samples/SELECTOR/showcode.asp?source=/msadc/Samples/../../../boot.ini.

Execute any SQL command directly to your database, e.g.,
http://www.yoursite.com/msadc/samples/adctest.asp.

View Outlook mail folders using CodeBrws.asp, e.g.,
http://www.yoursite.com/iissamples/exair/howitworks/codebrws.asp?source=/../../winnt/Profiles/Administrator/Application%20Data/Microsoft/Outlook%20Express/Mail/inbox.mbx The Minime pipe provides at least the following benefits: application protection from remote users attempting to hack a system using application vulnerabilities; temporary protection to applications until a patch is available and installed on the server; and custom patterns can be added and existing patterns can be removed from storage.

3. Hide & Seek

In an embodiment of the invention, a third pipe, herein referred to as "Hide & Seek," is applied to one or more application paths. Hide & Seek is a hypertext markup language driven pipe whose purpose is to ensure that an application operates as designed and implemented by the application owner. Hypertext markup language or HTML herein includes any type of markup language, such as, extensible markup language ("XML"), extensible hypertext markup language ("XHTML"), and wireless markup language ("WML"). Particularly, the pipe checks each outgoing HTML reply to identify its internal parameters names and values, and then validates the next user request corresponds to the previously identified parameters, thereby ensuring that subsequent user requests to the application are only those that the application expects or intended to be returned.

In an embodiment of the invention, a method comprises identifying a single client to interact with the application, identifying elements, e.g., parameter names and values, that were sent to the client in a reply from the application, determining whether a client's subsequent request to the application includes any parameter and values, and if so, determine whether those parameters and values are expected by the application. Only if the parameters and values received from the client correspond to the elements determined from the preceding, corresponding message sent will the server forward the request to the application.

In an embodiment of the invention, an algorithm performs HTML parsing on a reply document and stores all HTML tags that are received by the client. For example, a parser reads each reply coming from an application and identifies specific HTML elements, e.g., input, select, form, etc., in the reply message. For each identified element the parser determines the element value. All parsed element names and values are stored in a session object located on the server, wherein each session is related to a single client. After identifying the client and optionally attaching to the request a session object, an additional parser operates on the request. At this stage, a comparator is used to match the request with the reply based on the HTML elements. For example, the reply parser determines whether the client can change a parameter value on his next request. If so, it permits a client to send any value with this parameter. For example, if the application reply includes an <INPUT> tag, the client is expected to enter a value.

In order to identify a client in a state-less protocol, i.e., a protocol that is only concerned with the source and destination information, but not the contents of the message, a session-based cookie is utilized. Preferably, cookies are enabled on a client's web browser. For security purposes, a client without cookies enabled is considered as a 'new' or unauthorized user who is limited to minimal application activities. If cookies are enabled by the client, the server generates and stores a session-based cookie at the client upon initiation of a client-server session. In an embodiment of the invention, the session-based cookie comprises a header comprising client identification information and a cookie body comprising an encrypted security value identifying a session object.

The following is an exemplary implementation of the Hide & Seek pipe. A typical HTML document for login and password is as follows:

```
<HTML><BODY BGCOLOR="#FFFFFF">
<FORM name="faq" method=POST action="login.asp">
<BR><BR><BR><BR><CENTER><TABLE><TR>
<TD>Login:</TD>
<TD>Password:</TD>
</TR><TR>
<TD><INPUT TYPE="text" NAME="Login"></TD>
<TD><INPUT TYPE="password" NAME="password"></TD>
<TD><INPUT TYPE="hidden" NAME="state" value=0></TD>
</TR></TABLE><BR><BR>
```

-continued

```
<INPUT TYPE="submit" name="Submit">
</CENTER></FORM>
<FORM name="remember" method=POST action="remember.asp">
<BR><BR><BR><BR><CENTER><TABLE><TR>
<TD>Login: </TD></TR><TR>
<TD><INPUT TYPE="text" NAME="RememberPWS"></TD>
<TD><INPUT TYPE="hidden" NAME="state" value=2></TD>
</TR></TABLE><BR><BR>
<INPUT TYPE="submit" name="Submit"></CENTER>
<A HREF="/Terms.asp?x=1&y=3">Terms</A>
</FORM></BODY></HTML>
```

This HTML document is sent to the client upon the client first accessing a server. Upon parsing, the following exemplary results are stored in a session object:
[Group]=1
Login=[text]
Password=[text]
State=0
Submit=[text, not a must]
[Group]=2
RememberPWS=[text]
State=2
Submit=[text, not a must]
[Group]=3
X=1
Y=3

This session object is associated with a session value, which is stored in a cookie at the client. On the client's next subsequent request, i.e., the client's response to the server asking for a login and password, Hide & Seek obtains the session value from the client and identifies the session object associated with the session value. The pipe then obtains the results stored within the session object and validates the incoming parameter names and values against those results. If the incoming and outgoing parameters match, then the client is presumed to have not manipulated any of the parameters. However, if any of the incoming and respective outgoing parameters do not match, the user is presumed to have manipulated the request. Therefore, the incoming request is rejected.

In an embodiment of the invention, a refinement declaration table is employed to handle text fields, e.g., login field. The table includes parameters and its expected data type, length, allow null, etc.

Figure 8:
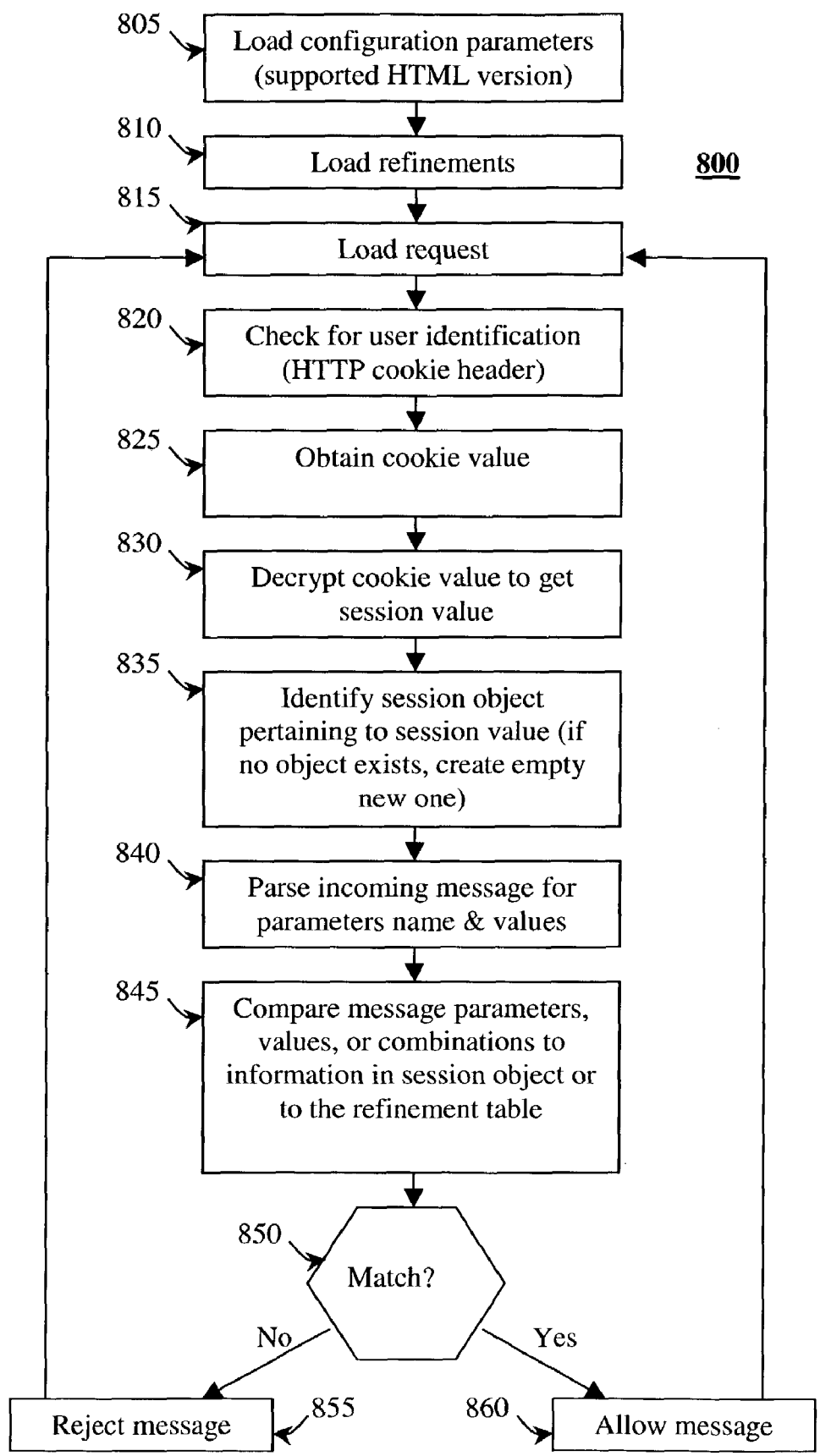

FIG. 8 illustrates a process 800 for implementing the Hide & Seek pipe according to an embodiment of the invention. Particularly, configuration parameters are loaded (step 805) according to a supported HTML version. Refinements are then optionally loaded (step 1010) if desired. An incoming operation request message is loaded (step 815) for analysis and then checked (step 820) for client identification in a HTTP cookie header. Subsequently, the body of the cookie is obtained (step 825) and decrypted (step 830) to get a session value. A session object associated with the session value is obtained (step 835). If no session object exists, a blank or new one is created. Then, the incoming message is parsed (step 840) into parameters name and values. Parameters, values, and combinations thereof are compared (step 845) to stored information in the session object or to the refinement table. An existence of a match is then determined (step 850). If a match is not found, the message is rejected (step 855). If all parameters match the message is allowed (step 860) to proceed. Steps 815-860 are repeated on subsequent incoming requests.

FIG. 9 illustrates a process 900 for implementing the Hide & Seek pipe on a reply message according to an embodiment of the invention. First, a reply message is received (step 910) and loaded (step 920) to determine (step 930) if the reply is an HTML document. If not HTML, the reply message is sent (step 940) to the client. If HTML, the reply message is parsed (step 950) into parameters. All parsed information is stored (step 960) in a session object. The session object is identified (step 970) as whether or not it is a new basket. If session object is not new, the message is sent (step 980) to the client. If the session object is new, a header is added (step 990) to the reply message comprising information identifying the session and then the entire message is then sent (step 995) to the client.

Hide & Seek protects applications from remote users manipulating an application business process. Further, it protects the application from any requests involving a manipulation technique and provides application owners with immediate and continuous shielding.

4. Locker

In an embodiment of the invention, a fourth pipe, herein referred to as "Locker," is applied to one or more application paths. This pipe protects application attributes such as, but not limited to HTML hidden fields, URL parameters, and the like from being modified or manipulated by a client. The pipe ensures that the attribute values set by the application are returned from the client without any modification. Particularly, an attributes identifier encrypts certain attributes sent to the client to prevent the client from manipulating them. In an embodiment of the invention, the attributes identifier uses a predefined list of attribute types to identify the particular attributes to be encrypted in each reply message. Application attributes are not extracted from the reply message nor stored in a database for later comparison to those correspondingly submitted by the client in a request. Instead, encryption is employed to prevent attribute manipulation by the client. Any type of encryption technique(s) can be employed, the identification and implementation of which are apparent to one of skill in the art.

In an embodiment of the invention, the Locker pipe employs a global server key and a private key specific to each message, i.e., reply. Particularly, the global server key is a single cryptographic key stored on a security server and is common to all reply messages. The message specific private key can be generated randomly per reply message or generated for all reply messages directed to a specific client. In operation, the message specific private key is used to encrypt the values of the application attributes in the reply. The message specific private key is then encrypted using the encrypted attributes and the global server key, the implementation of which is apparent to one of ordinary skill in the art, and appended, in encrypted form, to the reply, which is then sent on to the client. Encrypting the message specific private key with the encrypted values of the application attributes ensures that all application attributes will be submitted, by the client, without any modification back to the application server. The global server key ensures that a client can not decipher the message specific private key using the encrypted attribute values. Thus, clients will not be able to modify attributes even if the particular encryption algorithm is made public. In another embodiment of the invention, the administrator can manually set a list of application attributes that will no be encrypted. However, by default, all detected application attribute types are encrypted.

Figure 10A:
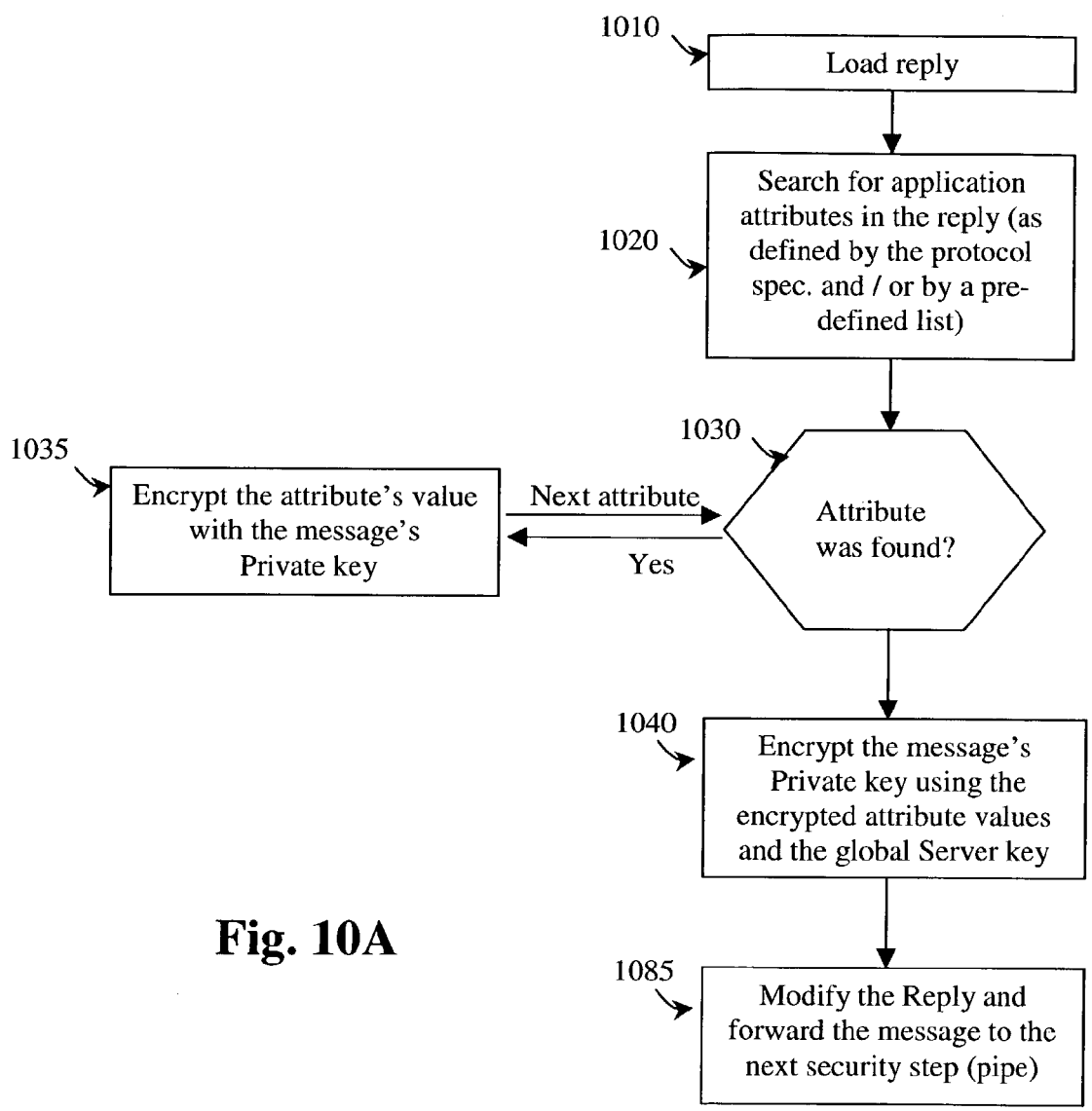
FIG. 10A illustrates a process of implementing the Locker pipe on an outgoing reply message, according to an embodiment.

FIG. 10A illustrates a process 1000 for implementing the Locker pipe on an outgoing reply message according to an embodiment of the invention. Specifically, the reply is loaded (step 1010) and then searched (step 1020) for application attributes as defined by the protocol specification and/or by a predefined list of attribute types. If an application attribute is found (step 1030) the value of that attribute is encrypted (step 1035) using a message specific private key, i.e., a unique cryptographic key specific to that reply, as described above. Upon encryption of all appropriate application attribute values, the message specific private key is encrypted (step 1040) using the encrypted attribute values and the global server key as described above. Use of the encrypted attribute values in encrypting the message specific private key adds an extra level of security to prevent an interloper from determining the message specific private key. Upon encryption of the message specific private key, the reply is then subsequently modified (step 1050) to reflect the encrypted attribute values and encrypted message specific private key, and is forwarded on to the next security pipe, if applicable, and/or on the client.

FIG. 10B displays an exemplary reply message prior to being modified by the Locker pipe. FIG. 10C displays this exemplary reply message as modified by the Locker pipe wherein all attribute values are encrypted and the message specific private key is appended to the reply. FIG. 10D displays another exemplary reply message as modified by the Locker pipe containing encrypted and non-encrypted (unmodified) original application attribute values. The original application values retained in non-encrypted form allow the client to view such, for example, in the situation where the client needs to view these original values (read-only).

Figure 11:
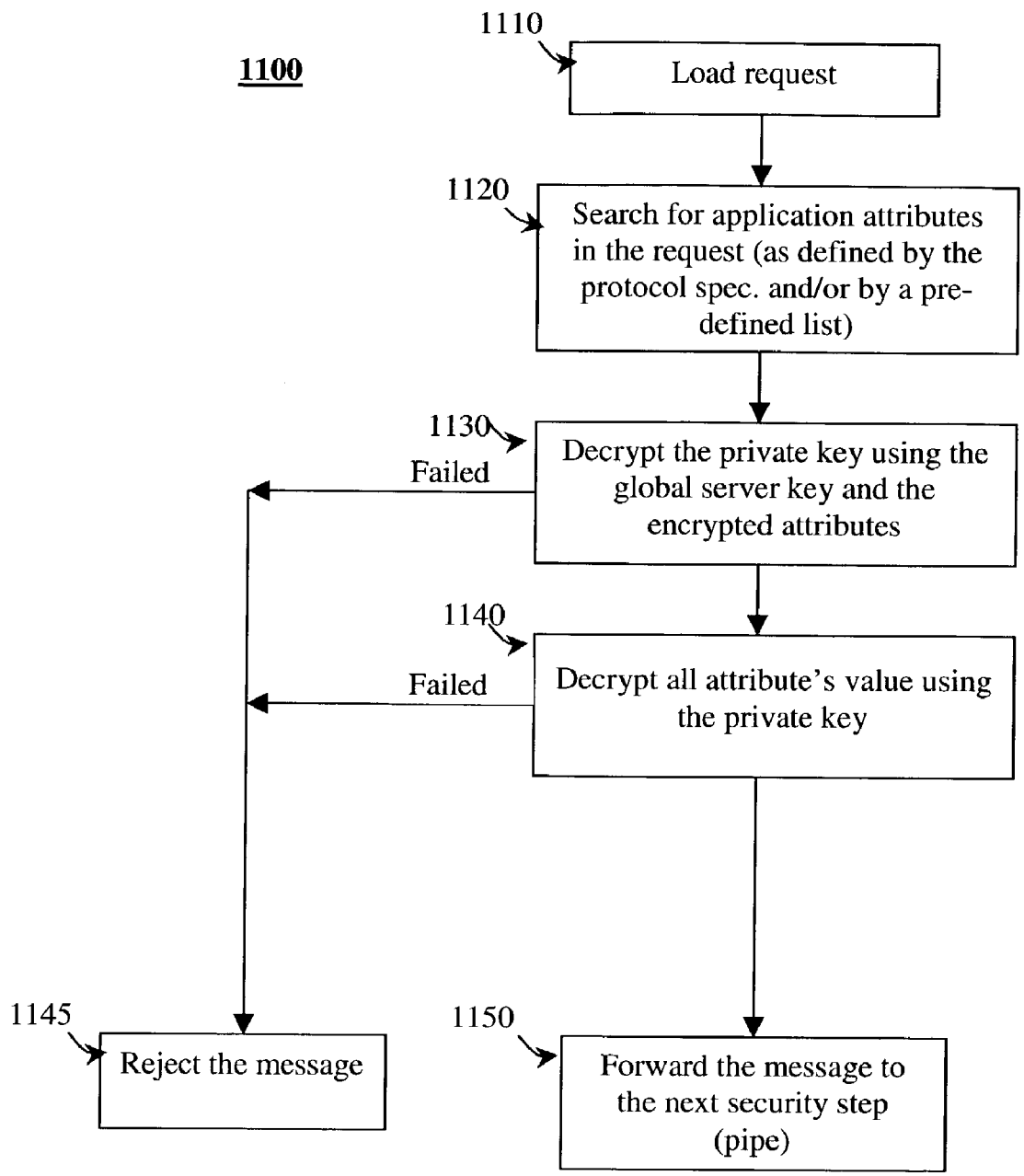
FIG. 11 displays a fourth pipe according to an embodiment of the invention.

FIG. 11 illustrates a process 1100 for implementing the Locker pipe on an incoming operation request (e.g., a request returning in response to the modified reply sent from the server in FIG. 10A) according to an embodiment of the invention. The incoming operation request is loaded (step 1110) for processing. The pipe searches (step 1120) for application attributes returned from the client and their corresponding encrypted values. The encrypted application attribute values and the global server key are used to decrypt (step 1130) the encrypted message specific private key. Failure to properly decrypt the message specific private key indicates a possible change in one or more of the encrypted application attribute values, which in turn causes an alert to be generated and/or complete rejection (step 1145) of the request. Successful decryption of the message specific private key allows each of the encrypted application attribute values to be decrypted (step 1140). Failure to decrypt one or more these encrypted values also indicates possible tampering by the client, thereby causing the generation of an alert and/or complete rejection (step 1145) of the request. If the application attribute values are successfully decrypted, the request is forwarded (step 1150) to the next security pipe, if applicable, or the application for further processing. If no application attributes are found, then steps 1130 and 1140 are not performed.

5. Inigo

In an embodiment of the invention, a fifth pipe, herein referred to as "Inigo," is applied to one or more application paths. Inigo is an application-node blocking pipe, which restricts application operation requests from entering application paths that are designated as restricted by an application owner. In an environment where business applications are running, application owners are typically faced with an administrative problem when a bug was found associated with an application path. However, stopping all execution of an application associated with that application path negatively affects one or more business processes the application implements. Therefore, application owners typically keep applications running, even though a vulnerability is known within the application, until a production patch is available. By implementing the Inigo pipe, application owners can block a vulnerable application path from being accessed while keeping other applications available to users.

Figure 12:
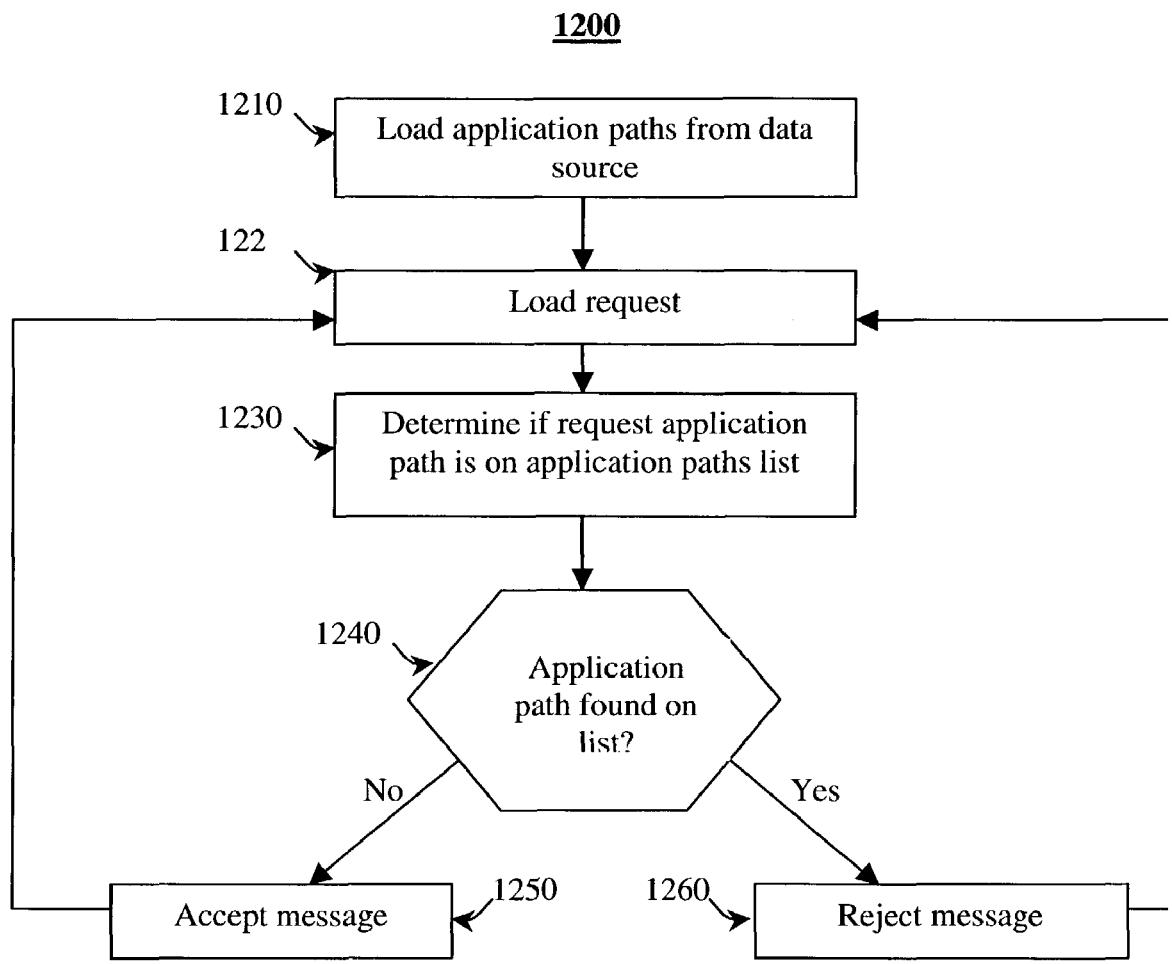
FIG. 12 illustrates a fifth pipe according to an embodiment of the invention.

FIG. 12 illustrates a process 1200 for implementing the Inigo pipe according to an embodiment of the invention. Application paths are loaded (step 1210) from a data source. An incoming request message is loaded (step 1220) into logic. The destination of the message is then determined (step 1230) and compared (step 1240) against specified application paths designated as blocked. If a match is found, the message is rejected (step 1260). If a match is not found, the message is allowed (step 1250) to pass.

For example, to block a press release directory from browsing, due to incorrect published information on the link:

http://www.yoursite.com/mysite/press/news.asp?newsid=23,

Indigo identifies requests for this application path and either rejects the request entirely or redirects the request so that a different press release, such as http://www.yoursite.com/mysite/default.html, is returned to the client.

The Inigo pipe provides application owners with immediate traffic blocking capabilities without waiting for production pipes to be implemented on all servers, thereby easing the complexity of administrating a single or large amount of applications when a vulnerability is found.

6. Ogini

In an embodiment of the invention, a sixth pipe, herein referred to as "Ogini," is applied to one or more application paths. Ogini is a pipe that blocks distrusted operation requests from being forward to a trusted environment or zone within a trusted network. By implementing this pipe, an administrator can restrict a client's specific messages to only those application paths that are designated as allowed. Particularly, a pre-defined list of allowed messages is implemented. If a client's request message matches any in the list, the operation request will be accepted. Otherwise, the operation request is rejected. To provide administrators with an easy way to update the allowed message list, the pipe optionally supports a learning technique, where all incoming request messages determined to be acceptable are stored in a memory for later comparison to incoming requests.

Figure 13:
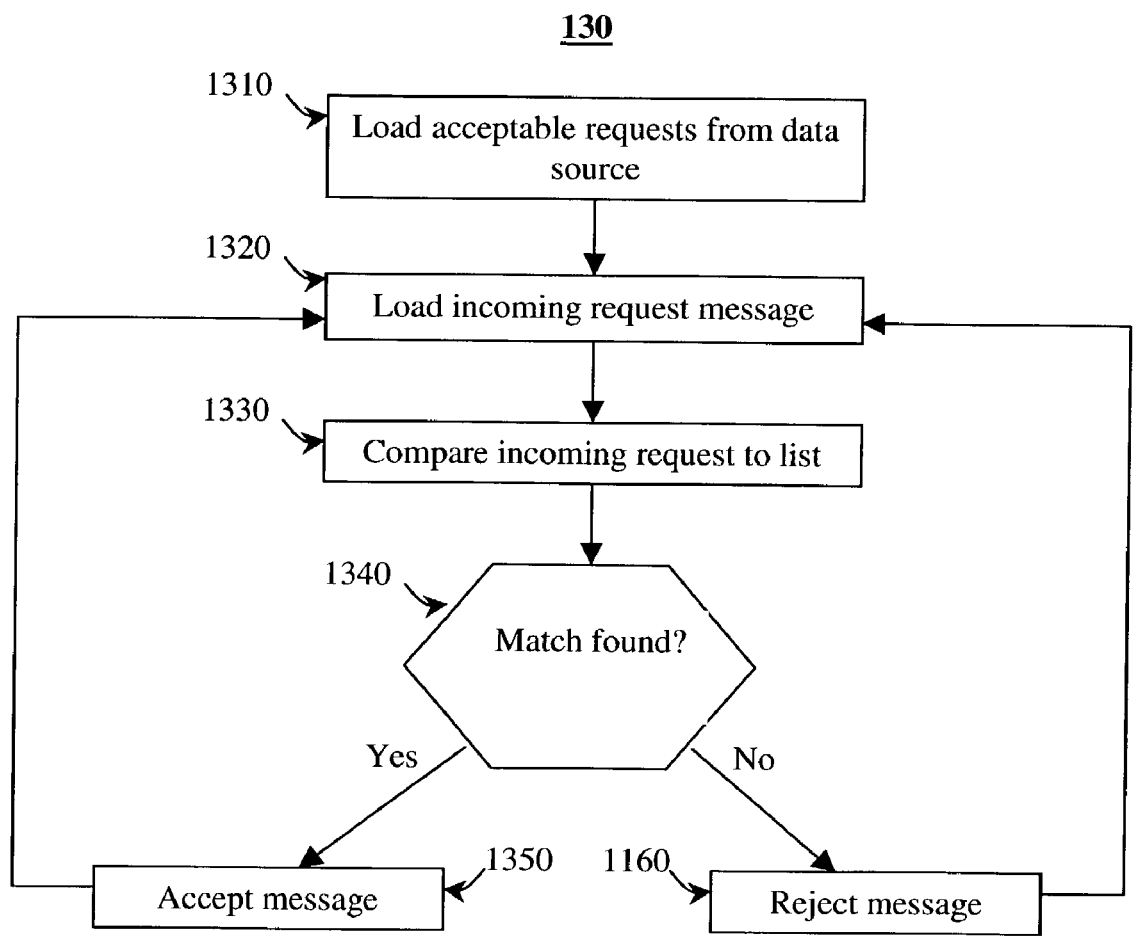
FIG. 13 illustrates a sixth pipe according to an embodiment of the invention.

FIG. 13 illustrates a process 1300 for implementing the Ogini pipe. Particularly, a list of acceptable operation requests is loaded (step 1310) into a processing means. The incoming message is loaded (step 1320) and compared (step 1330) to the list to determine (step 1340) if a match exists. If a match is found, the operation request is allowed (step 1350) to pass. Otherwise, the operation request is rejected (step 1360).

7. Miloba

In an embodiment of the invention, a seventh pipe, herein referred to as "Miloba," is applied to one or more application paths. Miloba is a pipe that validates an incoming parameter value according to pre-defined expression rules. For example, in an online bookstore, customers may be allowed to order one to five books in each order. The bookstore uses an order_qty parameter to represent the number of ordered books. Miloba verifies that the user order_qty parameter value will match an integer data type with a value between one and five. In an embodiment of the invention, in order to identify and construct the pre-defined expression rules for each parameter, learning techniques are implemented in a continuous process to identify new acceptable parameters within an operation request by updating the pre-defined rules based on previously submitted operation requests.

Figure 14:
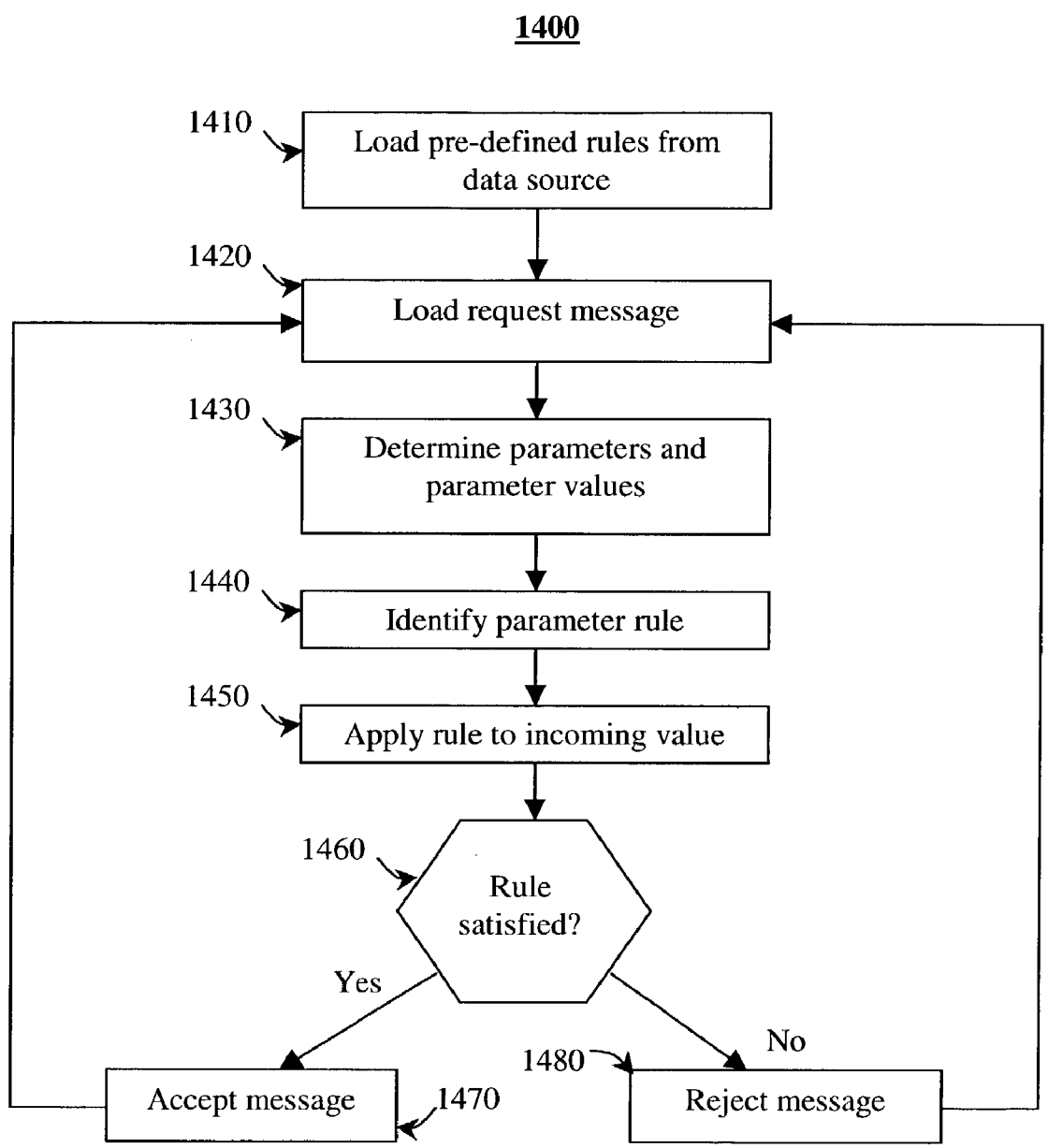
FIG. 14 illustrates a seventh pipe according to an embodiment of the invention.

FIG. 14 illustrates a process 1400 for implementing the Miloba pipe according to an embodiment of the invention. Pre-defined rules are loaded (step 1410) from a data source. An incoming operation request is loaded (step 1420) into a processing means. Parameter names and values contained within the operation request are determined (step 1430). For each type of parameter, a particular rule associated with that parameter is identified (step 1440) form the pre-defined rules and then applied (step 1450) to the incoming parameter value. Accordingly, it is determined (step 1460) whether the rule is satisfied. If satisfied, the parameter value is accepted (step 1470). Otherwise, the operation request is rejected (step 1480).

8. Cookie

In an embodiment of the invention, a eighth pipe, herein referred to as "Cookie," is applied to one or more application paths. This pipe protects client side (session based or persisted) cookies from being modified or manipulated by a client. The pipe ensures that information stored in the cookie is not available to the client, but will transparently be clear to the application without applying any change to the application itself. Particularly, cookie identification, which identifies a cookie that is associated with the request and its location, is encrypted on the client side to prevent a client from determining the identification of the cookie. Any type of encryption method can be employed, implementation of which is apparent to one of skill in the art.

Figure 15:
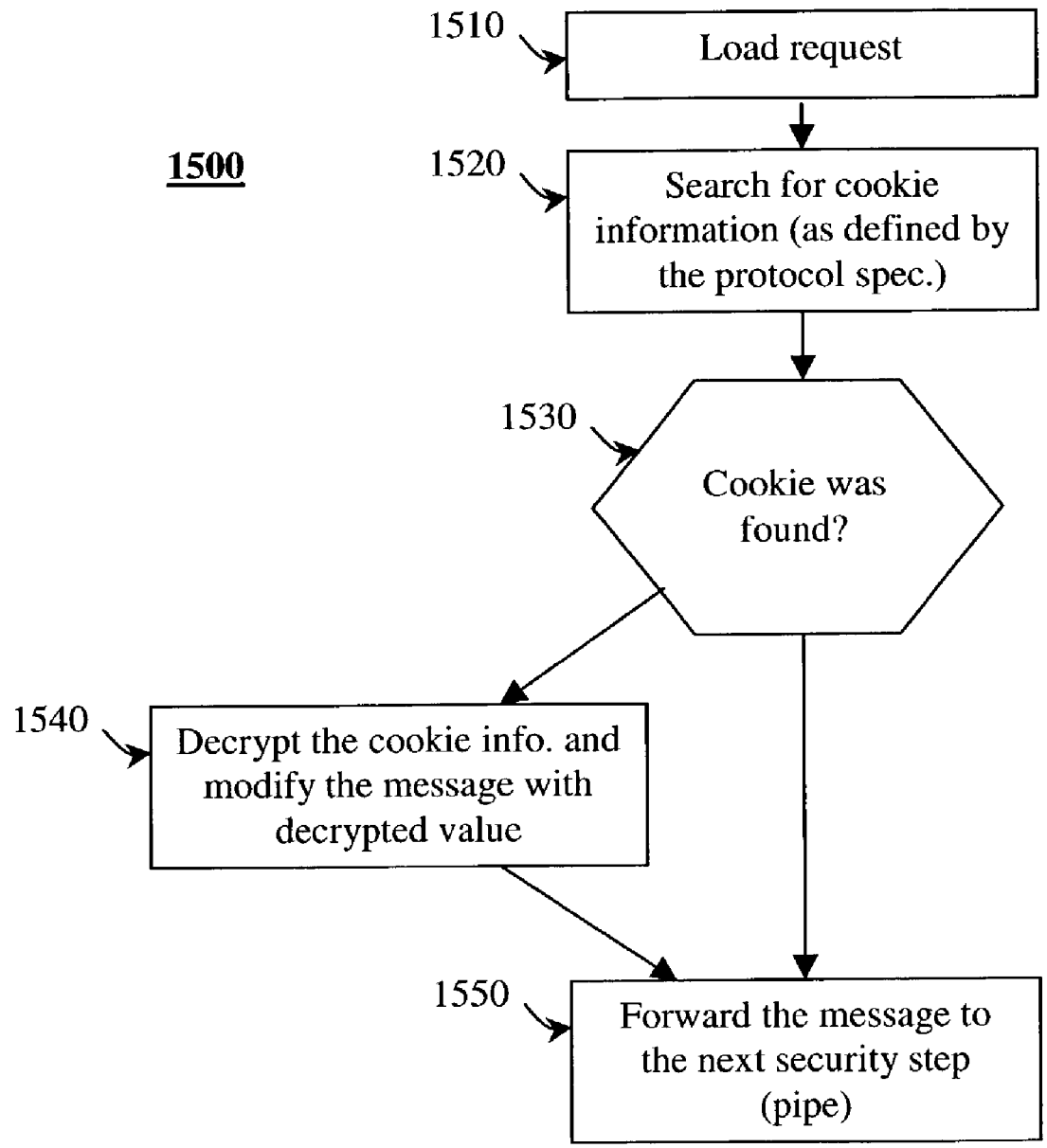
FIG. 15 and FIG. 16 illustrate an eighth pipe according to an embodiment of the invention.

FIG. 15 illustrates a process 1500 for implementing the Cookie pipe on an incoming operation request according to an embodiment of the invention. An incoming operation request is loaded (step 1510) into a processor. The pipe searches (step 1520) for cookie identification as defined by a protocol specification in the operation request. Then, the pipe determines (step 1530) whether any cookie identification was found. If found, the cookie information is decrypted and the operation request is modified (step 1540) by substituting the decrypted cookie information for the encrypted cookie information. The cookie is then forwarded (step 1550) to the next security pipe. If cookie information is not found, then step 1540 is not performed.

Figure 16:
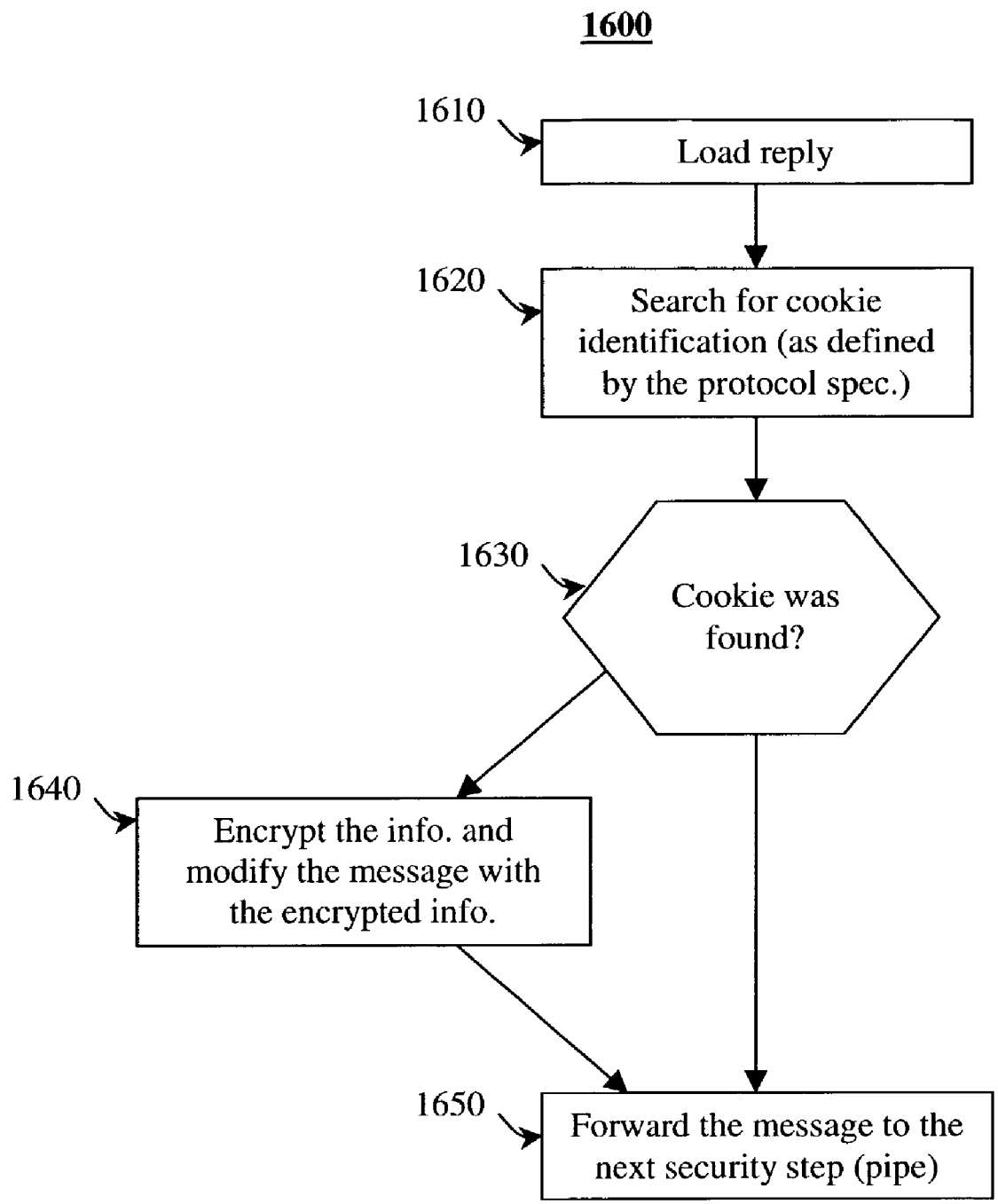

FIG. 16 illustrates a process 1600 for implementing the Cookie pipe on a reply message according to an embodiment of the invention. The reply is loaded (step 1610) and scanned (step 1620) for a cookie identification as defined by the protocol specification. If cookie identification was found (step 1630) that information is encrypted (step 1640). The reply is then subsequently modified to reflect the encrypted value. The message is then forwarded (step 1650) to the next security pipe or the client.

9. SOAP

In another embodiment of the invention, a SOAP pipe protects web services from servicing harmful client requests and preventing requests for services that remote clients or a specific client is unauthorized to call. Particularly, this pipe ensures that web services operate as designed and implemented by the application owner and that all client requests match the web service's definitions and data structures as well as allow access to only those services that remote clients are authorized to request.

Figure 17:
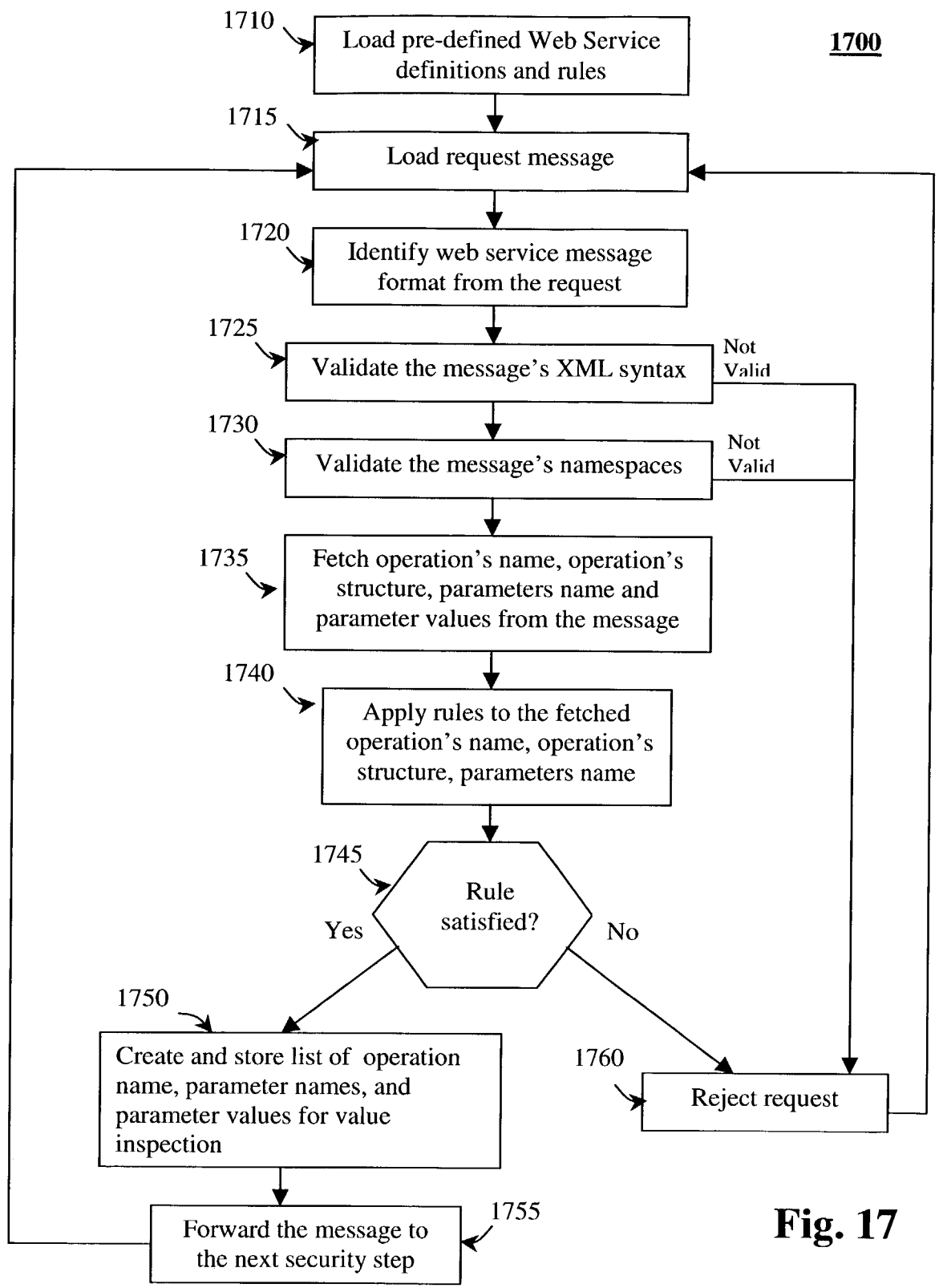
FIG. 17 illustrates a tenth pipe according to an embodiment of the invention.

FIG. 17 illustrates a process 1700 for implementing the SOAP pipe on an incoming operation request according to an embodiment of the invention. Pre-defined rules are loaded (step 1710) from a data source. The rules specify, for example if XML is used, valid XML message syntax, valid XML namespaces, operation names, operation structures, parameter names, and parameter data types. An incoming operation request is loaded (step 1715) into a processing means. The web service message format of the incoming request is identified (step 1720). The request message's XML syntax is then validated (step 1725) according to predefined syntax as identified by the web service message format. The message's namespaces are then validated (step 1730) according to a predefined list. Failure to validate in steps 1725 or 1730 results in the corresponding request being rejected (step 1760). Operation name, operation structure, parameter names, type and values contained within the operation request are fetched (step 1735), upon which particular rules associated with the identified service are then applied (step 1740) thereto. Accordingly, it is determined (step 1745) whether the rule(s) is satisfied. If satisfied, an internal list of operation names, parameter names, and parameter values is created and stored (step 1750) for further parameter value validation by the other system's pipes. After the parameter list is created and stored, the request message is forwarded (step 1755) to other pipes for value inspection. Otherwise, the operation request is rejected (step 1760).

10. Learning

In an embodiment of the invention, a learning technique is employed in one or more pipes applied on one or more application paths. The application of a learning technique allows the parameters in a request to be "fine tuned" to better match the most common values entered by the clients, i.e., requesters, determined from a statistical model. Particularly, all operation requests to each application path are gathered and stored into a virtual storage. A dynamic range of entered values is then built for each parameter in a request that a client sends. Based on the statistical mode implemented, a range of probable, i.e., most often entered or expected values is computed. Further, the values of the parameters may be adjusted based on the reply from the application.

For example, consider a database operation request that it is requesting that the contents of a stored field "F" be reported back to the requestor. A specified statistical model determined that ninety (90) percent of the requests ask for a particular F within the range of nine (9) to eighteen (18). Further, it is desired to limit F to within this range. In this example, any F value between nine (9) and eighteen (18) will be allowed to pass to the application and executed, however, a F value of twenty (20) will either be rejected totally, or adjusted to another value, such as the closest acceptable value, e.g., 18.

This technique is referred to as a learning technique because of it's ability to adjust or "learn" from the information accumulated from the parameter values and/or application paths requested over time. In other words, although the statistical model may not change, the range of the most common values dynamically changes with the values "learned" from numerous request operations. For example, the boundaries of the most common values may change as more and more values are received that are outside the original range of common values. The learning technique provides another method to strengthen the application layer protection. The learning operation can be applied on each web application separately or on all available tunnels.

In an embodiment of the invention, a web application comprises two modes of operation, e.g., a learn mode or an enabled mode. In the learn mode, the web application employs a method to collect all security errors determined by the pipes. For each error, the operation request's properties, such as, web application, tunnel, application path, and requested application; the operation message parameters; and the pipe that determined this security event are recorded. A refinement recommendation record for the relevant pipe is created at the relevant pipe. A refinement recommendation record comprises configuration information that the learning technique provides to the system administrator for application to each pipe. In the enabled mode of operation, for each incoming operation request, the web application determines if the operation request is an approved message by passing it to the pipe(s). If approved, the operation request is deemed to be trusted. If not, the operation request is passed along for additional pipe inspection.

In order to identify each parameter related regular expression, the learning technique uses a statistical normal distribution that accumulates each parameter value. Based on the current variance, the algorithm refines the current parameter regular expression validation process. For example, operation requests include a price parameter, such as:

| Step | Parameter value | Regular expression |
|------|-----------------|--------------------|
| 1 | Price = 12$ | Long [0-1e6],[a-z],[./'@$] |
| 2 | Price = 15 | Int [0-100],[/@$] |
| 3 | Price = 34$ | Int[5-50],[$] |
| 4 | Price = 25.5$ | Long[5-50],[.$] |
| X | Price = 22.2$ | Long[10-30][.$] |

The x step, represents the final regulation expression, the learning techniques has. A final stage is reached when the distribution variance of the parameter regulation expression is low.

The invention can complement conventional security technologies. For example, in an embodiment of the system, a firewall is included in between the distrusted network and the security system allowing the firewall to implement its security methods at the data link layer on distrusted operation requests before they are scrutinized at the application layer. In other embodiments, the inventive concept can be combined with any lower layer security technologies, such as, SSL or PKI.

Although the invention has been particularly shown and described with reference to several preferred embodiments thereof, it will be understood by those skilled in the art that various changes in form and details may be made therein without departing from the spirit and scope of the invention as defined in the appended claims.

I claim:

1. An application layer security method comprising the steps of:
   receiving, at an application-level switch at least partially implemented in hardware, an operation request to be executed by an application,
   identifying an application attribute of said operation request,
   identifying an application path associated with said identified application attribute,
   directing, at the application-level switch, said operation request to said identified application path, and
   applying one or more pipes to a portion of said operation request, wherein said one or more pipes are security components, and a number and each individual type of said one or more pipes are defined according to said identified application path.

2. The method of claim 1, wherein said step of identifying an application path comprises the step of comparing said identified application attribute to a predefined list of confirmed application attributes.

3. The method of claim 2, wherein said identified application path is a trusted application path to said application.

4. The method of claim 2, wherein said identified application path is a default application path.

5. The method of claim 1, wherein one of said one or more pipes comprises the step of inspecting said portion of said operation request for improper database request syntax or the existence of one or more embedded database commands.

6. The method of claim 1, wherein one of said one or more pipes comprises the step of inspecting said portion of said operation request for a known vulnerability pattern.

7. The method of claim 1, wherein one of said one or more pipes comprises the step of blocking said operation request if said identified application path is designated as restricted by an owner of said application.

8. The method of claim 1, wherein one of said one or more pipes comprises the step of blocking said operation request from being forwarded to a specified zone within a trusted network of said application.

9. The method of claim 1, wherein one of said one or more pipes comprises the step of validating a parameter of said operation request according to predefined expression rules.

10. The method of claim 1, wherein one of said one or more pipes comprises the step of protecting attribute values in said operation request, which are set by said application, from being modified.

11. The method of claim 1, wherein one of said one or more pipes comprises the step of validating web service definitions and data structures of said operation request.

12. The method of claim 1, wherein said step of directing said operation request to said identified application path is implemented by an application-level switch.

13. An application security system for protecting a trusted application comprising:
 an application-level switch at least partially implemented in hardware and comprising:
  an application attribute identifier, wherein said application attribute identifier identifies an application attribute of a message directed to or from said trusted application and identifies an application path associated with said identified application attribute; and
  a message router, wherein said message router routes each message to said identified application path associated with said message; and
 a number of security pipes, wherein said number of security pipes are security components to protect or monitor functionality of said trusted application, and wherein a portion of said number of security pipes are associated with said identified application path and are implemented on said message upon routing of said message to said application path.

14. The application security system of claim 13, further comprising a message identifier, wherein said message identifier comprises a list of confirmed messages and compares said message to said list of confirmed messages to identify if said message is a confirmed message.

15. The application security system of claim 14, wherein said message router routes a confirmed message to an application path having zero security pipes implemented thereon.

16. An application security method comprising the steps of:
 classifying, at an application-level switch at least partially implemented in hardware, an application attribute of a first message directed to or from a trusted application,
 identifying, at the application-level switch, a first application path associated with said classified application attribute of said first message,
 implementing on said first message a predetermined number of security pipes based on said identified first application path, wherein said predetermined number of security pipes are security components to protect or monitor functionality of a trusted application,
 classifying, at the application-level switch, an application attribute of a second message directed to or from a trusted application,
 identifying, at the application-level switch, a second application path associated with said classified application attribute of said second message,
 implementing on said second message a different predetermined number of security pipes based on said identified second application path.

17. The application security method of claim 16, wherein said first message is a request and further comprising the step of comparing said first request to a list of confirmed requests and if said first request matches one of said list of confirmed requests, said predetermined number is zero.

18. The application security method of claim 17, further comprising the step of dynamically updating said list of confirmed requests with another confirmed request.

19. The method of claim 1, wherein said identified application path is selected among a plurality of application paths, each of said plurality of application paths being associated with one or more pipes to be applied to a portion of said operation request in accordance with a routing scheme.

20. The method of claim 19, further comprising the step of updating said routing scheme.

21. The method of claim 20, wherein said step of updating said routing scheme comprises the step of dynamically altering said routing scheme.

22. The method of claim 19, wherein one of said plurality of application paths is associated with a particular pipe not associated with another one of said plurality of application paths.

* * * * *